US012726967B2

(12) United States Patent
Luo

(10) Patent No.: US 12,726,967 B2
(45) Date of Patent: Sep. 1, 2026

(54) INFORMATION REPORTING METHOD AND APPARATUS, BEAM SWITCHING METHOD AND APPARATUS, AND STORAGE MEDIUM

(71) Applicant: Beijing Xiaomi Mobile Software Co., Ltd., Beijing (CN)

(72) Inventor: Xingyi Luo, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 317 days.

(21) Appl. No.: 18/695,436

(22) PCT Filed: Sep. 28, 2021

(86) PCT No.: PCT/CN2021/121271

§ 371 (c)(1),
(2) Date: Mar. 26, 2024

(87) PCT Pub. No.: WO2023/050049

PCT Pub. Date: Apr. 6, 2023

(65) Prior Publication Data

US 2024/0397503 A1 Nov. 28, 2024

(51) Int. Cl.
*H04W 72/044* (2023.01)
*H04W 24/10* (2009.01)

(52) U.S. Cl.
CPC .......... *H04W 72/046* (2013.01); *H04W 24/10* (2013.01)

(58) Field of Classification Search
CPC ............................ H04W 72/046; H04W 24/10
See application file for complete search history.

(56) References Cited

U.S. PATENT DOCUMENTS

2020/0196351 A1 6/2020 Zhou et al.
2021/0120583 A1 4/2021 Wang et al.
2022/0232546 A1* 7/2022 Hakola .................. H04B 17/24
2024/0187076 A1* 6/2024 Eriksson ............... H04W 16/28

FOREIGN PATENT DOCUMENTS

| | | | |
|---|---|---|---|
| CN | 108243430 | A | 7/2018 |
| CN | 109451869 | A | 3/2019 |
| CN | 110475265 | A | 11/2019 |
| WO | 2021156822 | A1 | 8/2021 |
| WO | 2021181282 | A1 | 9/2021 |

OTHER PUBLICATIONS

Xiaomi. "Discussion on channel access mechanism for NR on 52.6-71 GHz" 3GPP TSG RAN WG1 #105-e, R1-2105557, May 27, 2021 (May 27, 2021), entire document.

* cited by examiner

*Primary Examiner* — Won Tae C Kim
(74) *Attorney, Agent, or Firm* — Volpe Koenig

(57) ABSTRACT

An information reporting method and apparatus, a beam switching method and apparatus, and a storage medium that improve a wireless communication system. The wireless communication system is improved by: determining an optimal receiving beam corresponding to at least one transmitting beam and reporting, to a base station, the optimal receiving beam corresponding to the at least one transmitting beam.

20 Claims, 18 Drawing Sheets

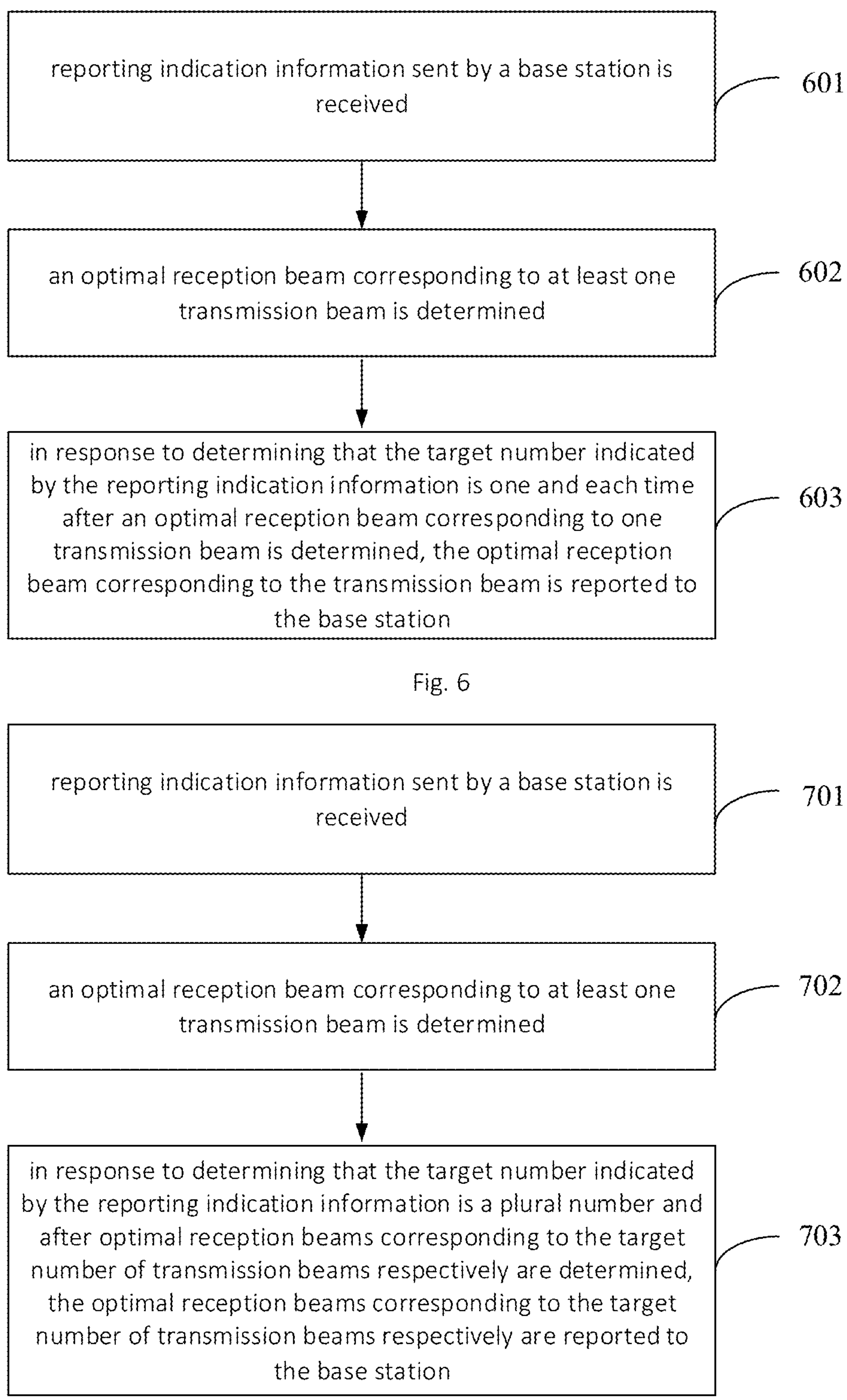
reporting indication information sent by a base station is received
601
an optimal reception beam corresponding to at least one transmission beam is determined
602
in response to determining that the target number indicated by the reporting indication information is one and each time after an optimal reception beam corresponding to one transmission beam is determined, the optimal reception beam corresponding to the transmission beam is reported to the base station
603
Fig. 6
reporting indication information sent by a base station is received
701
an optimal reception beam corresponding to at least one transmission beam is determined
702
in response to determining that the target number indicated by the reporting indication information is a plural number and after optimal reception beams corresponding to the target number of transmission beams respectively are determined, the optimal reception beams corresponding to the target number of transmission beams respectively are reported to the base station
703
Fig. 7

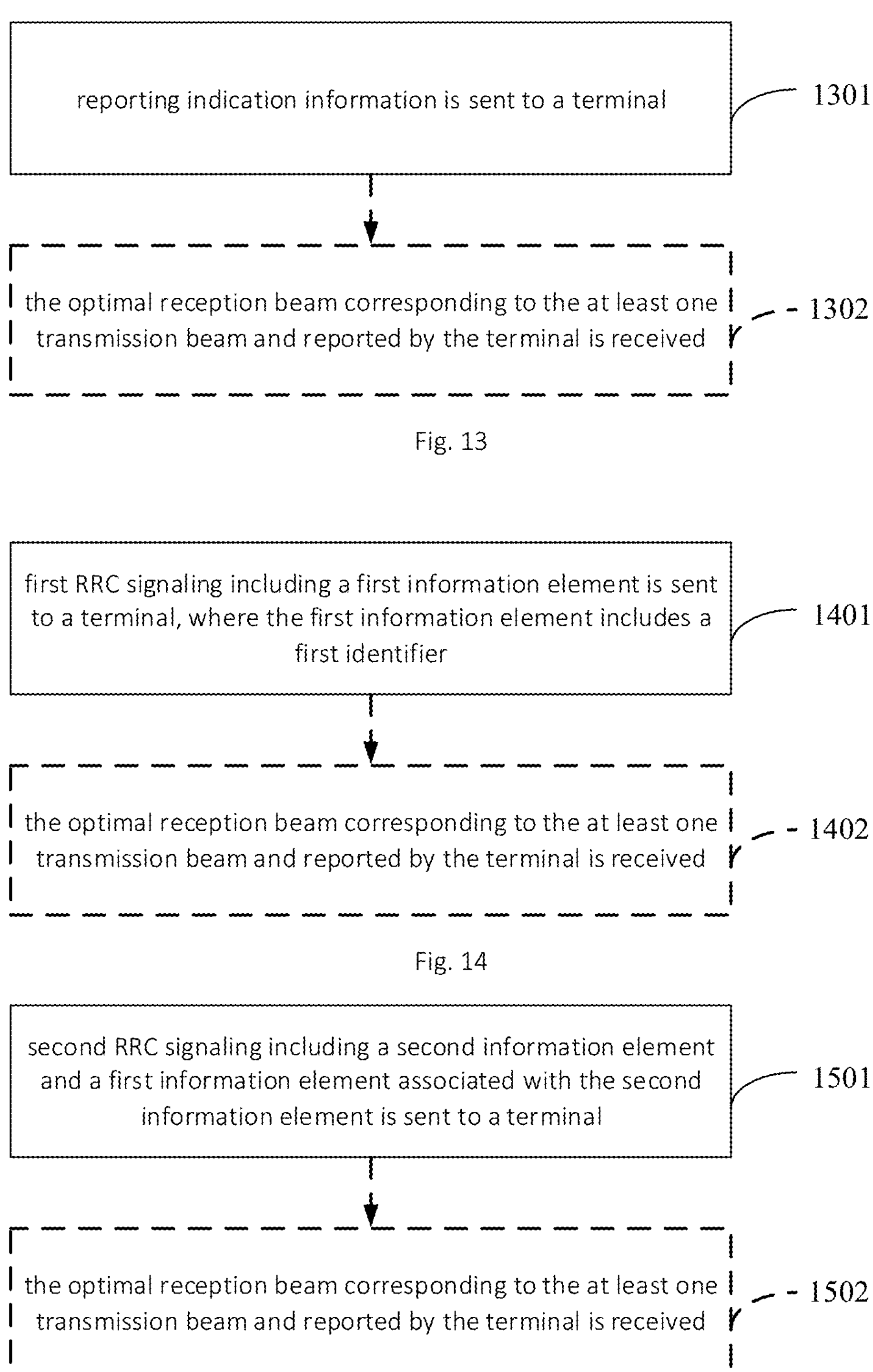
reporting indication information is sent to a terminal
1301
the optimal reception beam corresponding to the at least one transmission beam and reported by the terminal is received
1302
Fig. 13
first RRC signaling including a first information element is sent to a terminal, where the first information element includes a first identifier
1401
the optimal reception beam corresponding to the at least one transmission beam and reported by the terminal is received
1402
Fig. 14
second RRC signaling including a second information element and a first information element associated with the second information element is sent to a terminal
1501
the optimal reception beam corresponding to the at least one transmission beam and reported by the terminal is received
1502
Fig. 15

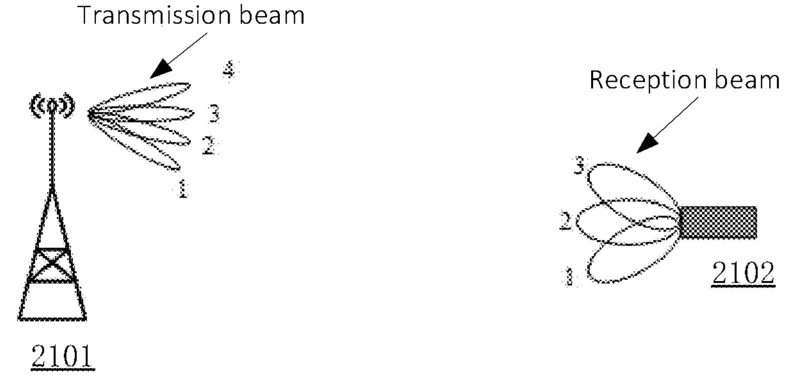
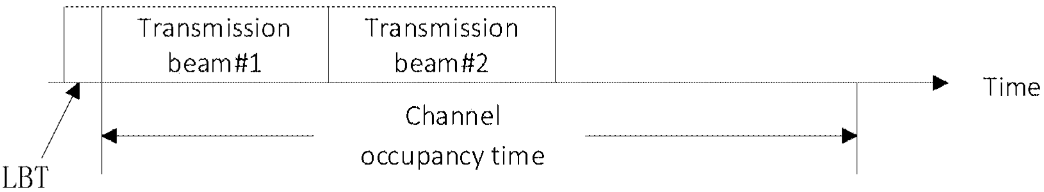
Fig. 21

INFORMATION REPORTING METHOD AND APPARATUS, BEAM SWITCHING METHOD AND APPARATUS, AND STORAGE MEDIUM

CROSS-REFERENCE TO RELATED APPLICATION

The present application is a U.S. National Phase of International Patent Application Serial No. PCT/CN2021/121271 filed on Sep. 28, 2021. The contents of the above-cited application are hereby incorporated by reference in their entirety for all purposes.

BACKGROUND OF THE INVENTION

Across an unlicensed frequency spectrum from 52.6 GHz to 71 GHz, whether a channel has been occupied is required to be determined before a base station communicates with a terminal. One channel occupancy time (COT) can be initiated for communication only when it is determined that the channel has not been occupied yet.

SUMMARY OF THE INVENTION

In order to solve the problems in the related art, examples of the disclosure provide an information reporting method and apparatus, a beam switching method and apparatus, and a storage medium.

In a first aspect, an information reporting method is provided in the example of the disclosure. The method is executed by a terminal and includes: determining an optimal reception beam corresponding to at least one transmission beam; and reporting the optimal reception beam corresponding to the at least one transmission beam to a base station.

In a second aspect, a beam switching method is provided in the example of the disclosure. The method is executed by a base station and includes: receiving an optimal reception beam corresponding to at least one transmission beam and reported by a terminal; determining, in response to determining a switch from a first transmission beam to a second transmission beam within the same channel occupancy time, a first optimal reception beam corresponding to the first transmission beam and a second optimal reception beam corresponding to the second transmission beam on the basis of the optimal reception beams corresponding to the at least one transmission beam and reported by the terminal; and switching from the first transmission beam to the second transmission beam in response to determining that the first optimal reception beam and the second optimal reception beam are the same beam.

In a third aspect, a non-transitory computer-readable storage medium is provided in the example of the disclosure. The non-transitory computer-readable storage medium stores a computer program, where the computer program is configured to execute the information reporting methods on a terminal side.

In a fourth aspect, a non-transitory computer-readable storage medium is provided in the example of the disclosure. The non-transitory computer-readable storage medium stores a computer program, where the computer program is configured to execute the beam switching methods on a base station side.

In a fifth aspect, an information reporting apparatus is provided in the example of the disclosure. The apparatus includes: one or more processors; and a memory configured to store a processor-executable instruction; where the one or more processors are collectively configured to execute the information reporting methods on a terminal side.

In a sixth aspect, a beam switching apparatus is provided in the example of the disclosure. The apparatus includes: one or more processors; and a memory configured to store a processor-executable instruction; where the one or more processors are collectively configured to execute the beam switching methods on a base station side.

It should be understood that the above general description and the following detailed description are merely illustrative and explanatory, and cannot limit the disclosure.

BRIEF DESCRIPTION OF DRAWINGS

The accompanying drawings here are incorporated into the description as a constituent part of the description, illustrate examples conforming to the disclosure, and serve to explain the principles of the disclosure along with the description.

FIG. 3 is a schematic flowchart of yet another information reporting method shown according to an example;

FIG. 6 is a schematic flowchart of yet another information reporting method shown according to an example;

FIG. 7 is a schematic flowchart of yet another information reporting method shown according to an example;

FIG. 11 is a schematic flowchart of a beam switching method shown according to an example;

FIG. 13 is a schematic flowchart of yet another beam switching method shown according to an example;

FIG. 14 is a schematic flowchart of yet another beam switching method shown according to an example;

FIG. 15 is a schematic flowchart of yet another beam switching method shown according to an example;

FIG. 21 is a schematic flowchart of yet another beam switching method shown according to an example;

DETAILED DESCRIPTION OF THE INVENTION

Examples will be described in detail here and are illustratively shown in the accompanying drawings. When the following description relates to the accompanying drawings, the same numbers in different accompanying drawings denote the same or similar elements unless indicated otherwise. The embodiments described in the following examples do not denote all embodiments consistent with the disclosure. On the contrary, the embodiments are merely instances of apparatuses and methods consistent with some aspects of the disclosure, as recited in the appended claims.

The terms used in the disclosure are merely to describe the specific examples, instead of limiting the disclosure. The singular forms such as "a", "an", "the", and "this" used in the disclosure and the appended claims are also intended to include the plural forms unless clearly stated otherwise in the context. It should also be understood that the term "and/or" used here indicates and encompasses any or all possible combinations of at least one associated item listed.

It should be understood that although the terms "first," "second," "third," etc., may be employed in the disclosure to describe various information, such information should not be limited to these terms. These terms are merely used to distinguish the same type of information from each other. For example, first information can also be referred to as second information, and similarly, second information can also be referred to as first information, without departing from the scope of the disclosure. Depending on the context, the word "if" as used here can be interpreted as "at the time of," "when," or "in response to determining."

The disclosure relates to the field of communication, and in particular to an information reporting method and apparatus, a beam switching method and apparatus, and a storage medium.

Across an unlicensed frequency spectrum from 52.6 GHz to 71 GHZ, whether a channel has been occupied is required to be determined before a base station communicates with a terminal. One channel occupancy time (COT) can be initiated for communication only when it is determined that the channel has not been occupied yet.

However, in one COT, whether a channel corresponding to the new transmission beam has been occupied is unclear in the case of switches to a new transmission beam, and thus has to be determined for each switch, which increases time overhead of beam switching.

The information reporting method provided by the disclosure is first described from a terminal side below.

Figure 1:
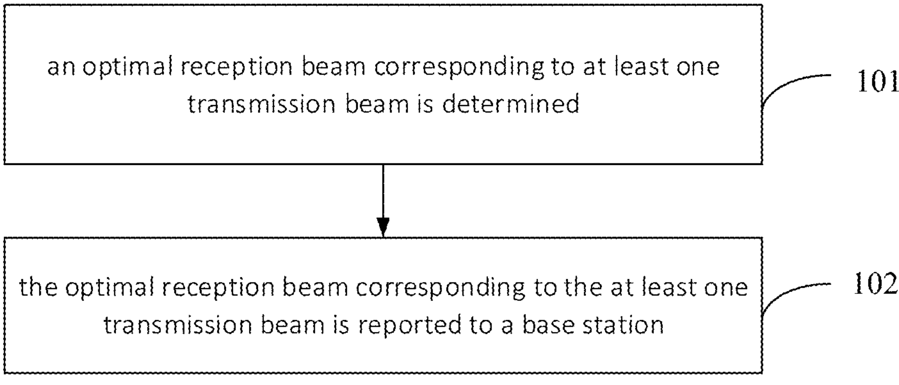
FIG. 1 is a schematic flowchart of an information reporting method shown according to an example.

An information reporting method is provided in an example of the disclosure. With reference to FIG. 1, a flowchart of an information reporting method is shown according to an example. The method may be applied to a terminal and may include step 101 and step 102.

Step 101, an optimal reception beam corresponding to at least one transmission beam is determined.

In the example of the disclosure, the terminal may determine the optimal reception beam corresponding to the at least one transmission beam through beam measurement. The transmission beam is a beam used when a base station side transmits a reference signal, data, and/or signaling. The reception beam is a beam used when the terminal side receives the above information transmitted from the base station side. In a beam measurement process, after the base station side fixes one transmission beam, the terminal side determines an optimal reception beam corresponding to a current transmission beam from a plurality of reception beams used by the terminal side in a beam scanning manner. The optimal reception beam may be a reception beam having an optimal quality of the reference signal received among the plurality of reception beams.

Step 102, the optimal reception beam corresponding to the at least one transmission beam is reported to a base station.

In the above example, after determining the optimal reception beam corresponding to the at least one transmission beam, the terminal may report to the base station. The base station side performs beam switching on the basis of reporting from the terminal side, with great simplicity and high availability.

In some alternative examples, the terminal may report the optimal reception beam corresponding to the at least one transmission beam to the base station on the basis of an indication from the base station side.

Figure 2:
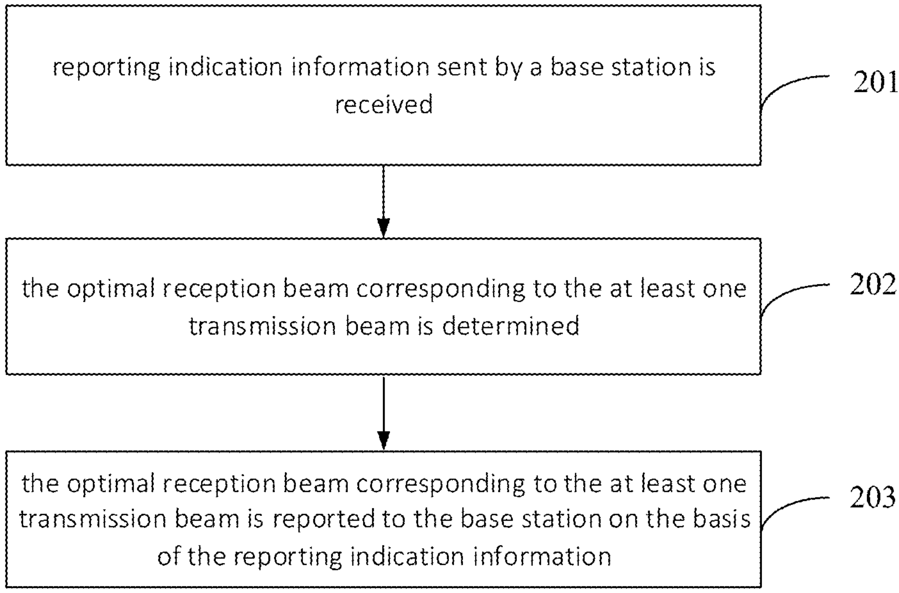
FIG. 2 is a schematic flowchart of another information reporting method shown according to an example.

With reference to FIG. 2, a flowchart of an information reporting method is shown according to an example. The method may be applied to a terminal and may include steps 201, 202, and 203.

Step 201, reporting indication information sent by a base station is received.

In a possible embodiment, the reporting indication information is configured to indicate whether to report the optimal reception beam corresponding to the at least one transmission beam.

In a possible embodiment, the reporting indication information is configured to indicate a target number of the transmission beam reported each time. The target number may indicate one or more transmission beams, which will not be limited in the disclosure.

In another possible embodiment, the reporting indication information is configured to indicate whether to report the optimal reception beam corresponding to the at least one transmission beam, and a target number of the transmission beam reported each time.

Step 202, the optimal reception beam corresponding to the at least one transmission beam is determined.

Step 203, the optimal reception beam corresponding to the at least one transmission beam is reported to the base station on the basis of the reporting indication information.

In the above example, the terminal may report the optimal reception beam corresponding to the at least one transmission beam to the base station on the basis of the report indication information sent from a base station side, so that the availability is high.

In some alternative examples, with reference to FIG. 3, a flowchart of an information reporting method is shown according to an example. The method may be applied to a terminal and may include steps 301, 302, and 303.

Step 301, reporting indication information sent by a base station is received.

In the example of the disclosure, the reporting indication information is at least configured to indicate whether to report an optimal reception beam corresponding to at least one transmission beam.

Step 302, the optimal reception beam corresponding to the at least one transmission beam is determined.

Step 303, the optimal reception beam corresponding to the at least one transmission beam is reported to the base station in response to determining that the reporting indication information indicates that the optimal reception beam corresponding to the at least one transmission beam is to be reported.

In the above example, the terminal may report the above content to the base station under the condition that the base station instructs the terminal to report the optimal reception beam corresponding to the at least one transmission beam, so that the availability is high.

Figure 4:
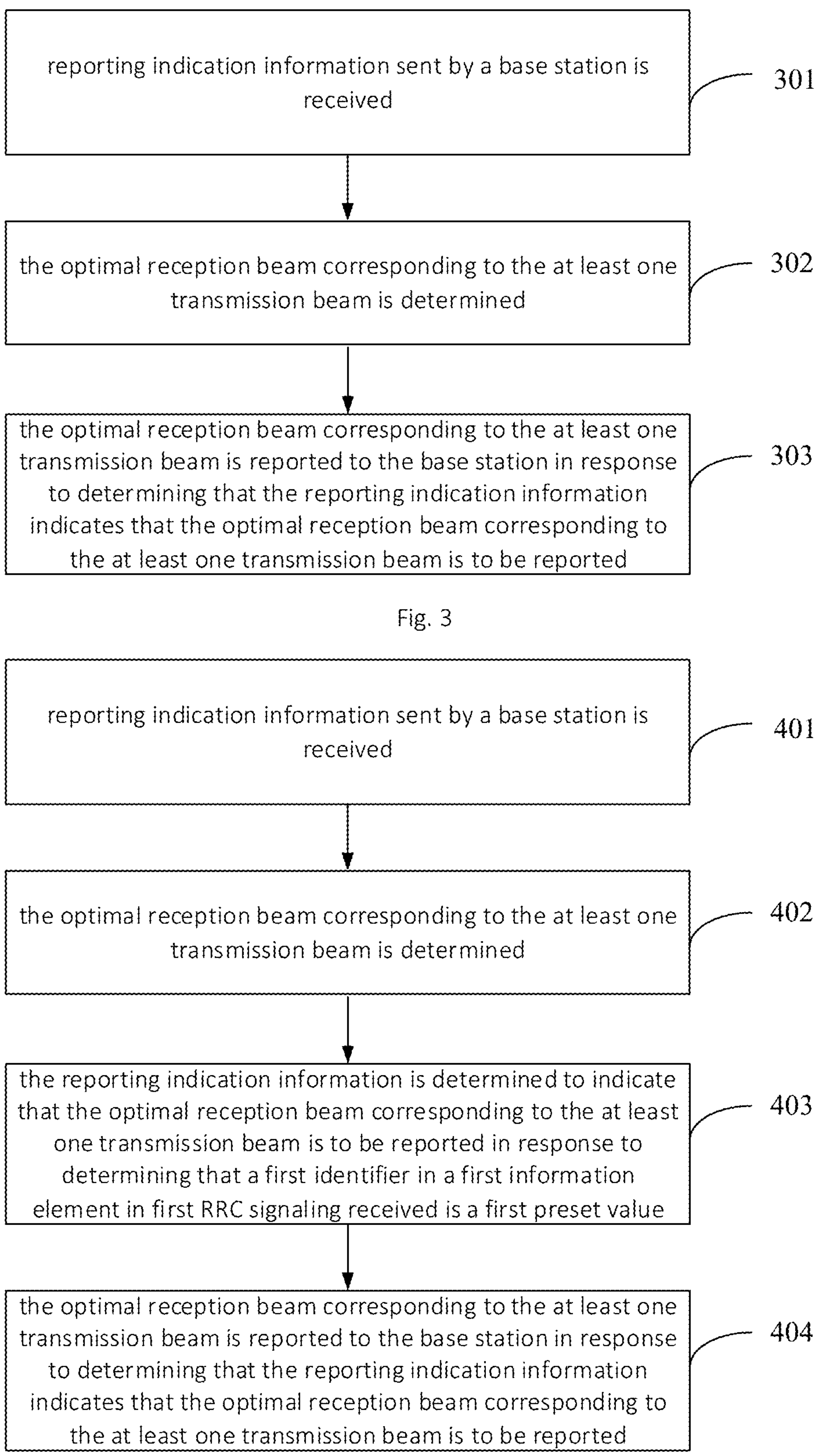
FIG. 4 is a schematic flowchart of yet another information reporting method shown according to an example.

In some alternative examples, with reference to FIG. 4, a flowchart of an information reporting method is shown according to an example. The method may be applied to a terminal and may include steps 401, 402, 403, and 404.

Step 401, reporting indication information sent by a base station is received.

In the example of the disclosure, the base station may indicate whether the terminal reports the optimal reception beam corresponding to the at least one transmission beam through a separate identifier in radio resource control (RRC) signaling.

Step 402, the optimal reception beam corresponding to the at least one transmission beam is determined.

Step 403, the reporting indication information is determined to indicate that the optimal reception beam corresponding to the at least one transmission beam is to be reported in response to determining that a first identifier in a first information element in first RRC signaling received is a first preset value.

In the example of the disclosure, the first information element may be an information element configured to configure channel state information (CSI) reporting, i.e., a CSI-report config information element. The base station adds the first identifier into the first information element in first RRC signaling. The first identification is configured to indicate whether to report an identifier of the optimal reception beam corresponding to the at least one transmission beam.

The terminal determines that the reporting indication information indicates that the optimal reception beam corresponding to the at least one transmission beam is to be reported under the condition that the first identifier is the first preset value. The first preset value may equal 1 or zero, which will not be limited in the disclosure.

Step 404, the optimal reception beam corresponding to the at least one transmission beam is reported to the base station in response to determining that the reporting indication information indicates that the optimal reception beam corresponding to the at least one transmission beam is to be reported.

In the above example, the terminal may report the optimal reception beam corresponding to the at least one transmission beam to the base station under the condition that the terminal determines that the base station instructs the terminal to report the optimal reception beam corresponding to the at least one transmission beam on the basis of the first identifier in first RRC signaling sent by the base station. Accordingly, the resource waste caused by automatic reporting by the terminal without the permission from the base station is avoided.

Figure 5:
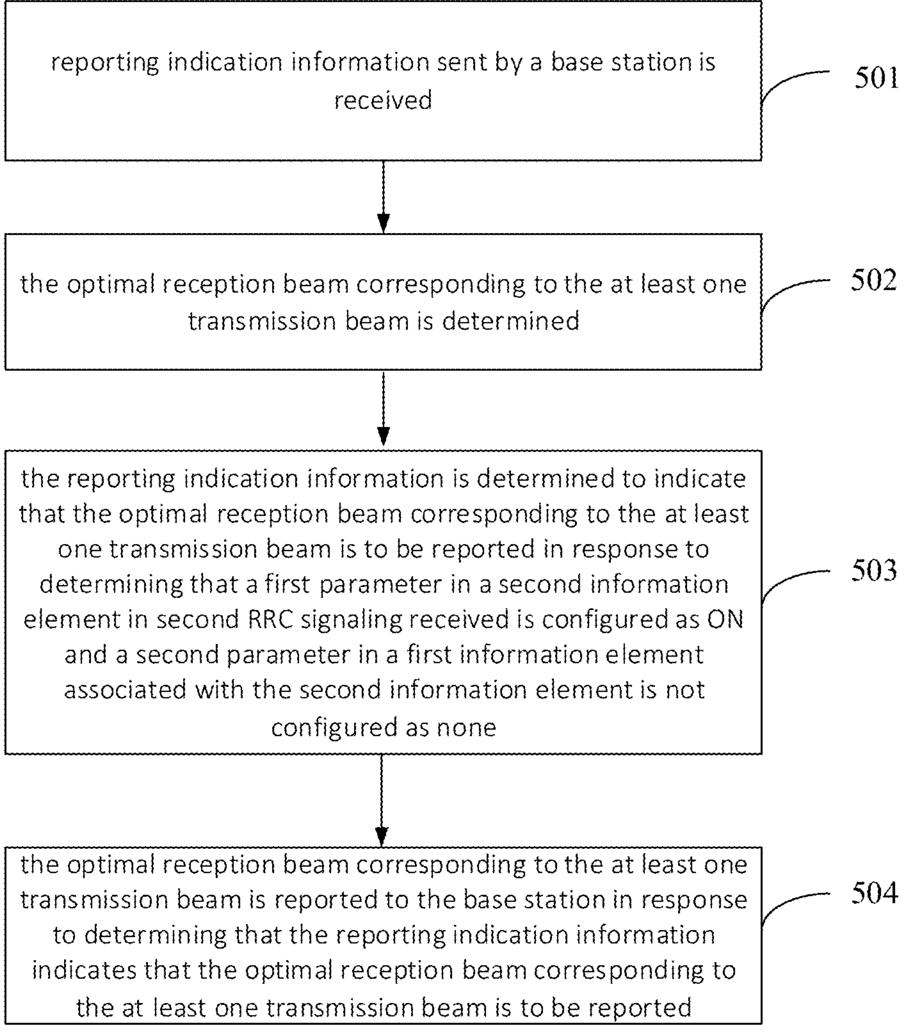
FIG. 5 is a schematic flowchart of yet another information reporting method shown according to an example.

In some alternative examples, with reference to FIG. 5, a flowchart of an information reporting method is shown according to an example. The method may be applied to a terminal and may include steps 501, 502, 503 and 504.

Step 501, reporting indication information sent by a base station is received.

In the example of the disclosure, the base station may reuse an existing identifier in RRC signaling to indicate whether the terminal reports an optimal reception beam corresponding to at least one transmission beam.

Step 502, the optimal reception beam corresponding to the at least one transmission beam is determined.

Step 503, the reporting indication information is determined to indicate that the optimal reception beam corresponding to the at least one transmission beam is to be reported in response to determining that a first parameter in a second information element in second RRC signaling received is configured as ON and a second parameter in a first information element associated with the second information element is not configured as none.

In the example of the disclosure, the second information element may be an information element configured to configure a non-zero power CSI reference signal resource set, for example, a non-zero power (NZP)-CSI-reference signal (RS)-resource set information element. The first parameter in the second information element may be a REPETITIN parameter. The first information element may be an information element configured to configure CSI reporting, i.e., a CSI-report config information element. The second parameter may be, but is not limited to, a reportQuanity parameter. The first information element is determined to be associated with the second information element under the condition that a measurement reference signal set configured for the first information element includes a reference signal configured for the second information element.

In the related art, if the first parameter is configured as ON, the second parameter in the first information element associated must be configured as none. In the example of the disclosure, the reporting indication information is determined to indicate that the optimal reception beam corresponding to the at least one transmission beam is to be reported if the terminal determines that the first parameter in the second information element is configured as ON and a second parameter in the first information element associated is not configured as none. Optionally, the second parameter may be configured as a layer 1 (physical layer)-reference signal receiving power (L1-RSRP), a layer 1-signal to interference plus noise ratio (L1-SINR), etc., which will not be limited in the disclosure.

Step 504, the optimal reception beam corresponding to the at least one transmission beam is reported to the base station in response to determining that the reporting indication information indicates that the optimal reception beam corresponding to the at least one transmission beam is to be reported.

In the above example, the terminal may report the optimal reception beam corresponding to the at least one transmission beam to the base station under the condition that the terminal determines that the base station instructs the terminal to report the optimal reception beam corresponding to the at least one transmission beam on the basis of the identifier reused in second RRC signaling sent by the base station. Accordingly, the resource waste caused by automatic reporting by the terminal without the permission from the base station is avoided.

In some alternative examples, with reference to FIG. 6, a flowchart of an information reporting method is shown according to an example. The method may be applied to a terminal and may include steps 601, 602, and 603.

Step 601, reporting indication information sent by a base station is received.

In the example of the disclosure, the base station may indicate a target number to be reported through a third parameter in RRC signaling. The third parameter may be a parameter configured to indicate the target number, including, but not limited to, a parameter newly added into RRC signaling. In one embodiment, the third parameter is a designated parameter reused by the target number. In one embodiment, the designated parameter may be a nroReportedRS parameter. Step 602, an optimal reception beam corresponding to at least one transmission beam is determined.

Step 603, in response to determining that the target number indicated by the reporting indication information is one and each time after an optimal reception beam corresponding to one transmission beam is determined, the optimal reception beam corresponding to the transmission beam is reported to the base station.

In the example of the disclosure, third RRC signaling may be the same RRC signaling as first RRC signaling or not. Alternatively, third RRC signaling may be the same RRC signaling as second RRC signaling or not, which will not be limited in the disclosure. In response to determining that the target number determined through the third parameter in third RRC signaling received is one and each time after the optimal reception beam corresponding to one transmission beam is determined, the terminal reports the optimal reception beam corresponding to the transmission beam to the base station.

In the above example, in a beam measurement process, after determining the optimal reception beam corresponding to one transmission beam through beam scanning at a terminal side each time on the basis of the reporting indication information sent by the base station, the terminal may report to the base station, with great simplicity and high availability.

In some alternative examples, with reference to FIG. 7, a flowchart of an information reporting method is shown according to an example. The method may be applied to a terminal and may include steps 701, 702, and 703.

Step 701, reporting indication information sent by a base station is received.

In the example of the disclosure, the base station may indicate a target number to be reported through a third parameter in RRC signaling. The third parameter may be a parameter configured to indicate the target number, including, but not limited to, a parameter newly added into RRC signaling. Alternatively, the third parameter is a designated parameter reused by the target number. In one embodiment, the designated parameter may be a nroReportedRS parameter.

Step 702, an optimal reception beam corresponding to at least one transmission beam is determined.

Step 703, in response to determining that the target number indicated by the reporting indication information is a plural number and after optimal reception beams corresponding to the target number of transmission beams respectively are determined, the optimal reception beams corresponding to the target number of transmission beams respectively are reported to the base station.

In the example of the disclosure, third RRC signaling may be the same as first RRC signaling or not. Alternatively, third RRC signaling may be the same as second RRC signaling or not, which will not be limited in the disclosure. In response to determining that the target number determined through the third parameter in third RRC signaling received is a plural number and after determining the optimal reception beams corresponding to the target number of transmission beams respectively, the terminal reports the optimal reception beam corresponding to the transmission beam to the base station.

In one embodiment, the target number may equal four. When the target number equals four, after determining the optimal reception beams corresponding to four transmission beams respectively, the terminal reports the optimal reception beams corresponding to the four transmission beams respectively to the base station after performing beam scanning at the terminal side for the fourth time, that is, the last time.

In the above example, in the beam measurement process, after determining the optimal reception beams corresponding to the target number of transmission beams respectively, the terminal reports the optimal reception beams corresponding to the target number of transmission beams respectively to the base station with great simplicity and high availability.

In some alternative examples, the terminal determines the optimal reception beam corresponding to the at least one transmission beam to the base station in response to determining that the reporting indication information indicates that the optimal reception beam corresponding to the at least one transmission beam is to be reported. Specifically, on the basis of a predetermined number of transmission beams pre-agreed in a protocol, after determining optimal reception beams corresponding to a predetermined number of transmission beams, the terminal reports the optimal reception beams corresponding to a predetermined number of transmission beams to the base station.

In another possible embodiment, the terminal determines the target number of transmission beam reported each time on the basis of the reporting indication information. After determining the target number, the terminal determines that the base station allows to report the optimal reception beam corresponding to the at least one transmission beam. Then after determining the optimal reception beams corresponding to the target number of transmission beams, the terminal reports the optimal reception beams corresponding to the target number of transmission beams to the base station.

In another possible embodiment, the reporting indication information indicates whether to report the optimal reception beam corresponding to the at least one transmission beam, and the target number of the transmission beam reported each time. The terminal is required to report to the base station under the condition that the reporting indication information indicates that the optimal reception beam corresponding to the at least one transmission beam is to be reported, and the optimal reception beams corresponding to the target number of transmission beams respectively are determined.

The above description is merely illustrative. In practical application, all other solutions in which an optimal reception beam corresponding to a transmission beam is reported on the basis of an indication from a base station should fall within the scope of protection of the disclosure.

In the above example, the terminal may report the optimal reception beam corresponding to the at least one transmission beam to the base station on the basis of the indication from the base station side. The base station side performs beam switching on the basis of the reporting from a terminal side, with great simplicity and high availability.

In some alternative examples, the terminal may report the optimal reception beam corresponding to the at least one transmission beam to the base station in the following manner:

The terminal numbers its own reception beams and determines an index value corresponding to each reception beam. After completing beam scanning, the terminal reports the optimal reception beam corresponding to the at least one transmission beam to the base station through a physical uplink control channel (PUCCH) resource and/or a physical uplink shared channel (PUSCH) resource according to the reporting indication information sent by the base station.

Specifically, the terminal reports identification information of the at least one transmission beam and an index value of the optimal reception beam corresponding to the at least one transmission beam to the base station. The identification information of the transmission beam includes at least one of the following: a CSI-RS resource indicator (CRI) corresponding to the transmission beam and/or a synchronization signal block resource indicator (SSBI) corresponding to the transmission beam.

In the above example, the terminal may report the identification information of the at least one transmission beam and the index value of the optimal reception beam corresponding to the at least one transmission beam to the base station through the PUCCH resource and/or a PUSCH resource. The base station may perform beam switching on the basis of a content reported from a terminal side, with the great simplicity and high availability.

In the above examples, the example involving the identification information of the transmission beam and/or the index value of the reception beam may be applied to the disclosure or any other examples outside the disclosure, which will not be limited in the disclosure. Any solution involving determining identification of the transmission beam and/or the index value of the reception beam should fall within the scope of protection of the disclosure.

In some alternative examples, the terminal may initiate a scheduling request actively to request the base station to allocate a target resource configured to report the optimal reception beam corresponding to the at least one transmission beam to the terminal, and then report the optimal reception beam corresponding to the at least one transmission beam to the base station through the target resource.

In the above example, the example in which the terminal initiates the scheduling request actively may be applied to any example of the disclosure, and may also be applied to any other examples outside the disclosure, which will not be limited in the disclosure.

Figure 8:
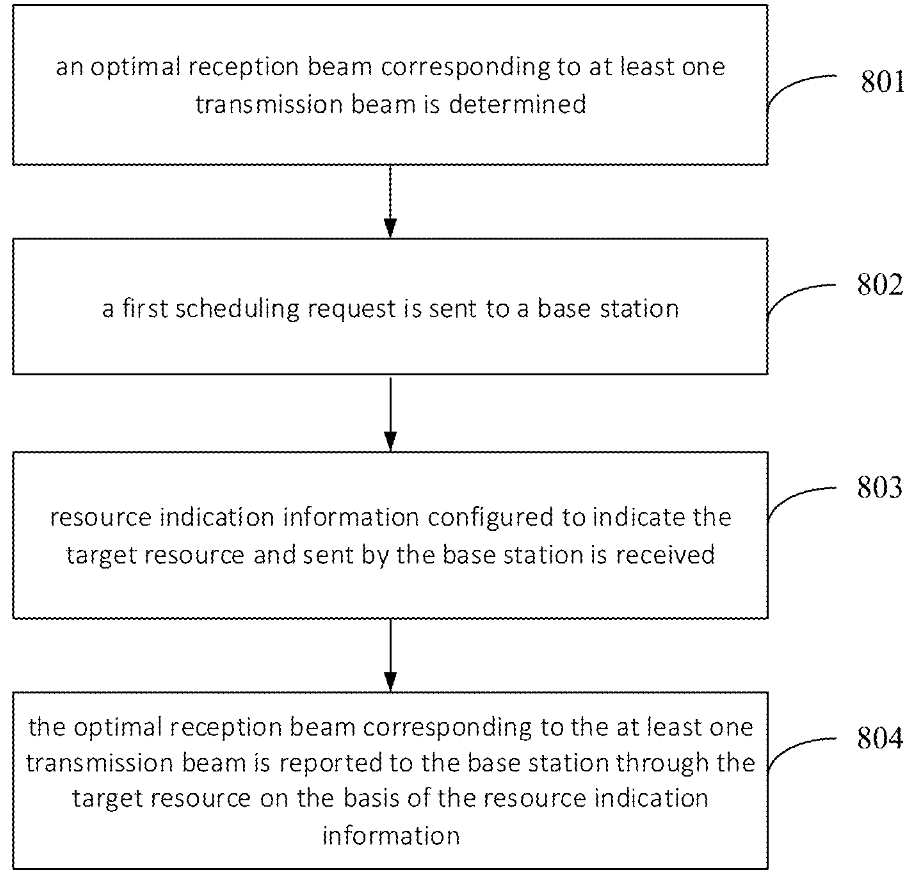
FIG. 8 is a schematic flowchart of yet another information reporting method shown according to an example.

With reference to FIG. 8, a flowchart of an information reporting method is shown according to an example. The method may be applied to a terminal and may include steps 801, 802, 803, and 804.

Step 801, an optimal reception beam corresponding to at least one transmission beam is determined.

Step 802, a first scheduling request is sent to a base station.

In the example of the disclosure, after completing beam measurement and determining the optimal reception beam corresponding to the at least one transmission beam, the terminal may send the first scheduling request to the base station. The first scheduling request is configured to request the base station to configure a target resource configured to report the optimal reception beam corresponding to the at least one transmission beam for the terminal.

Step 803, resource indication information configured to indicate the target resource and sent by the base station is received.

Step 804, the optimal reception beam corresponding to the at least one transmission beam is reported to the base station through the target resource on the basis of the resource indication information.

In the above example, after completing beam measurement and determining the optimal reception beam corresponding to the at least one transmission beam, the terminal may acquire the target resource through the first scheduling request, so as to report the optimal reception beam corresponding to the at least one transmission beam to the base station through the target resource. The objective of reporting the optimal reception beam corresponding to the at least one transmission beam to the base station is also realized, with high availability.

Figure 9:
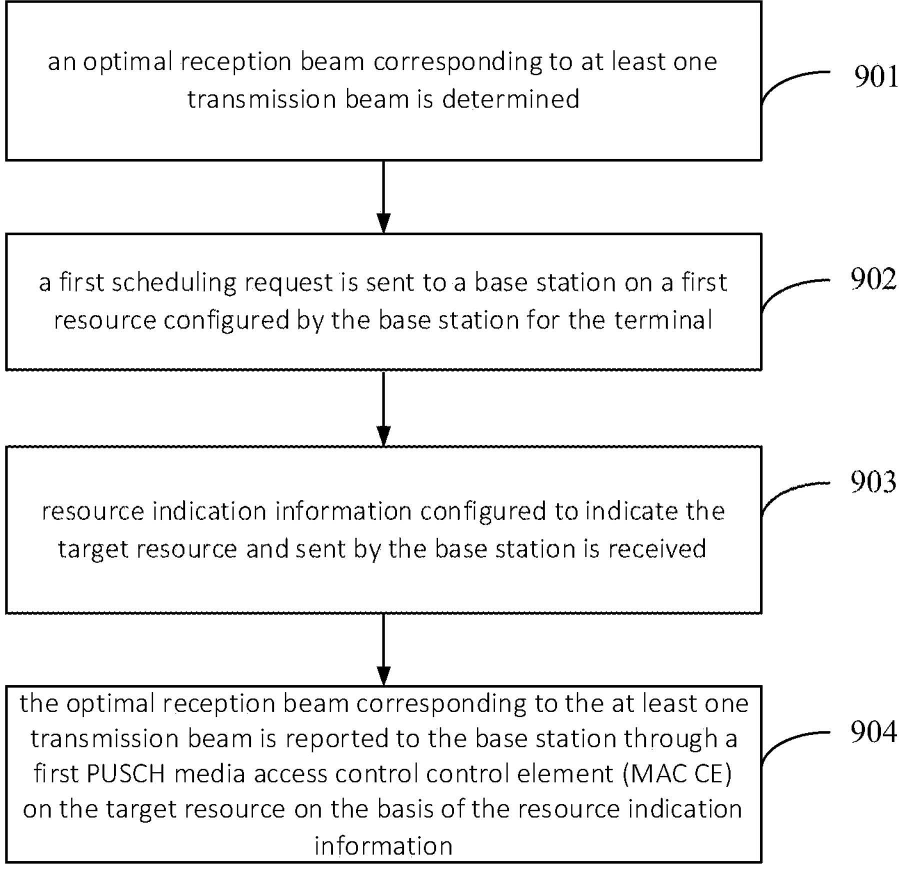
FIG. 9 is a schematic flowchart of yet another information reporting method shown according to an example.

In some alternative examples, with reference to FIG. 9, a flowchart of an information reporting method is shown according to an example. The method may be applied to a terminal and may include steps 901, 902, 903, and 904.

Step 901, an optimal reception beam corresponding to at least one transmission beam is determined.

Step 902, a first scheduling request is sent to a base station on a first resource configured by the base station for the terminal.

In the example of the disclosure, the first resource is configured for the terminal to send the first scheduling request only. That is, the first resource is a resource configured by the base station specifically for the terminal to send the first scheduling request.

Step 903, resource indication information configured to indicate the target resource and sent by the base station is received.

Step 904, the optimal reception beam corresponding to the at least one transmission beam is reported to the base station through a first PUSCH media access control control element (MAC CE) on the target resource on the basis of the resource indication information.

In the example of the disclosure, the terminal may report the optimal reception beam corresponding to the at least one transmission beam to the base station through the first PUSCH MAC CE. Specifically, the first PUSCH MAC CE at least includes: identification information of the at least one transmission beam and an index value of the optimal reception beam corresponding to the at least one transmission beam. The identification information of the transmission beam includes at least one of the following: a CSI reference signal resource indicator corresponding to the transmission beam; and/or a synchronization signal block resource indicator corresponding to the transmission beam.

In the above example, the terminal may send the first scheduling request through the first resource configured by the base station specifically for the terminal. Further, the terminal may report the optimal reception beam corresponding to the at least one transmission beam to the base station on the basis of the target resource configured by the base station. Thus, the objective of reporting the reception beam corresponding to the at least one transmission beam to the base station is realized, with the high availability.

Figure 10:
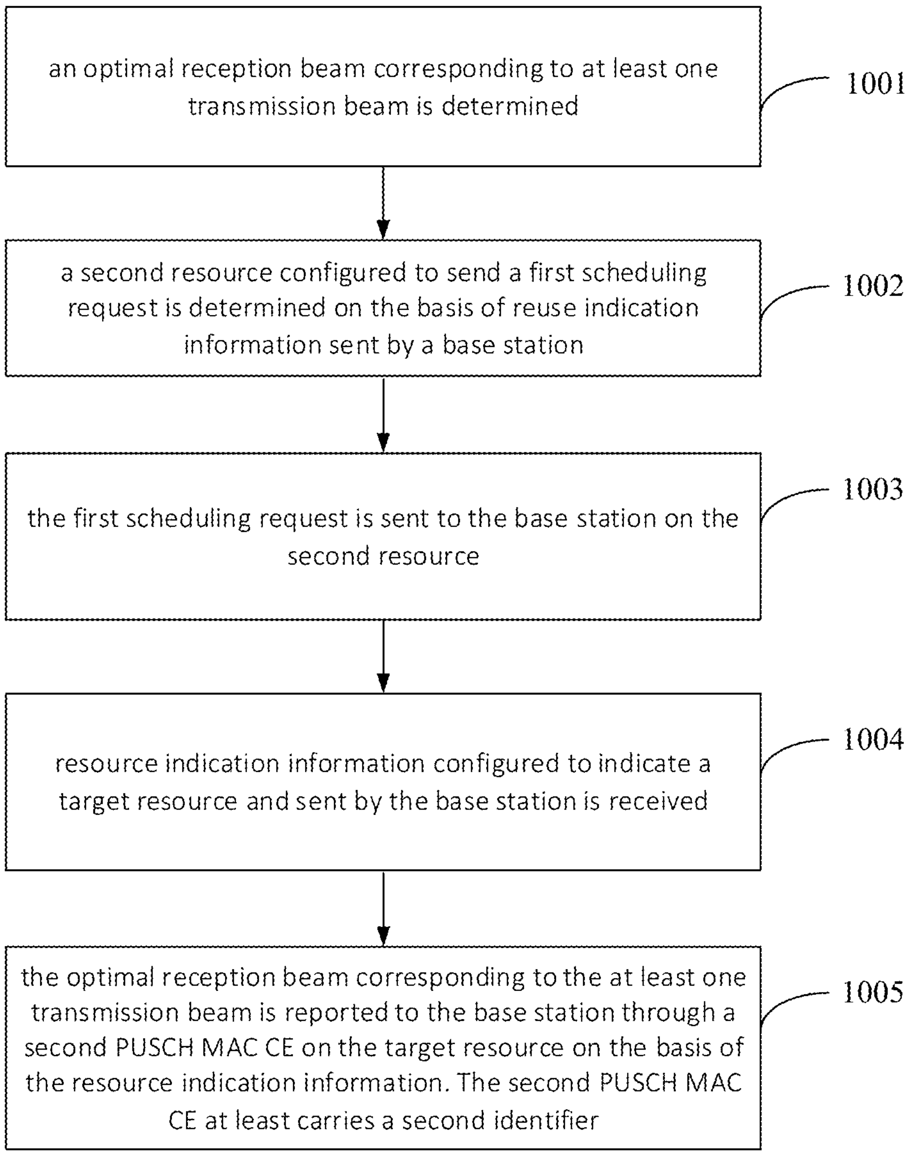
FIG. 10 is a schematic flowchart of still another information reporting method shown according to an example.

In some alternative examples, with reference to FIG. 10, a flowchart of an information reporting method is shown according to an example. The method may be applied to a terminal and may include steps 1001, 1002, 1003, 1004, and 1005.

Step 1001, an optimal reception beam corresponding to at least one transmission beam is determined.

Step 1002, a second resource configured to send a first scheduling request is determined on the basis of reuse indication information sent by a base station.

The reuse indication information is configured to indicate that the second resource reuses a designated resource pre-allocated to the terminal. The designated resource is a resource for the terminal to send a second scheduling request. In the example of the disclosure, the second scheduling request may be a beam failure recovery (BFR) scheduling request of a secondary cell (Scell), etc., which will not be limited in the disclosure.

Step 1003, the first scheduling request is sent to the base station on the second resource.

Step 1004, resource indication information configured to indicate a target resource and sent by the base station is received.

Step 1005, the optimal reception beam corresponding to the at least one transmission beam is reported to the base station through a second PUSCH MAC CE on the target resource on the basis of the resource indication information. The second PUSCH MAC CE at least carries a second identifier.

In the example of the disclosure, when the terminal reports through the second PUSCH MAC CE, the second PUSCH MAC CE is required to at least include the second identifier. The second identifier is configured to indicate that an information content reported through the second PUSCH MAC CE is the optimal reception beam corresponding to the at least one transmission beam. Also, the second PUSCH MAC CE may also include: identification information of the at least one transmission beam and an index value of the optimal reception beam corresponding to the at least one transmission beam. The identification information of the transmission beam includes at least one of the following: a CSI reference signal resource indicator corresponding to the transmission beam; and/or a synchronization signal block resource indicator corresponding to the transmission beam.

In a possible embodiment, the second identifier may identify that the information content reported is the optimal reception beam corresponding to the at least one transmission beam if being set to 1. The second identifier may identify that the information content reported is an information content related to BFR if being set to zero.

In another possible embodiment, the second identifier may identify that the information content reported is the optimal reception beam corresponding to the at least one transmission beam if being set to zero. The second identifier may identify that the information content reported is an information content related to BFR if being set to 1.

In the above example, the terminal may reuse the second resource to send the first scheduling request to the base station. Further, when the terminal reports the optimal reception beam corresponding to the at least one transmission beam on the basis of a target resource configured by the base station, the second PUSCH MAC CE is required to at least carry the second identifier, so as to indicate that the information content reported is the optimal reception beam corresponding to the at least one transmission beam. The objective of reporting the reception beam corresponding to the at least one transmission beam to the base station is realized, and the availability of high.

A beam switching method provided by the disclosure is described from a base station side below.

With reference to FIG. 11, a flowchart of a beam switching method is shown according to an example. The method may be applied to a base station and may include steps 1101, 1102, and 1103.

Step 1101, an optimal reception beam corresponding to at least one transmission beam and reported by a terminal is received.

Step 1102, in response to determining a switch from a first transmission beam to a second transmission beam within the same channel occupancy time, a first optimal reception beam corresponding to the first transmission beam and a second optimal reception beam corresponding to the second transmission beam are determined on the basis of the optimal reception beams corresponding to the at least one transmission beam and reported by the terminal.

In the example of the disclosure, if the base station determines to perform beam switching within the same COT, the first optimal reception beam corresponding to the first transmission beam and the second optimal reception beam corresponding to the second transmission beam are determined on the basis of the optimal reception beams corresponding to the at least one transmission beam and reported by the terminal.

Step 1103, switching from the first transmission beam to the second transmission beam is performed in response to determining that the first optimal reception beam and the second optimal reception beam are the same beam.

In the example of the disclosure, if determining that the first optimal reception beam and the second optimal reception beam are the same beam, the base station may perform beam switching directly without performing listen before talk (LBT).

In the above example, if it is determined that an optimal reception beam corresponding to a transmission beam after switching is consistent with an optimal reception beam corresponding to a transmission beam before switching, the base station may perform beam switching directly without detecting a channel occupancy condition when transmission beam switching is performed each time under the condition that the base station determines to perform beam switching within the same channel occupancy time on the basis of reporting from the terminal side. Accordingly, the time overload of beam switching within the same channel occupancy time is reduced, with the high availability.

Figure 12:
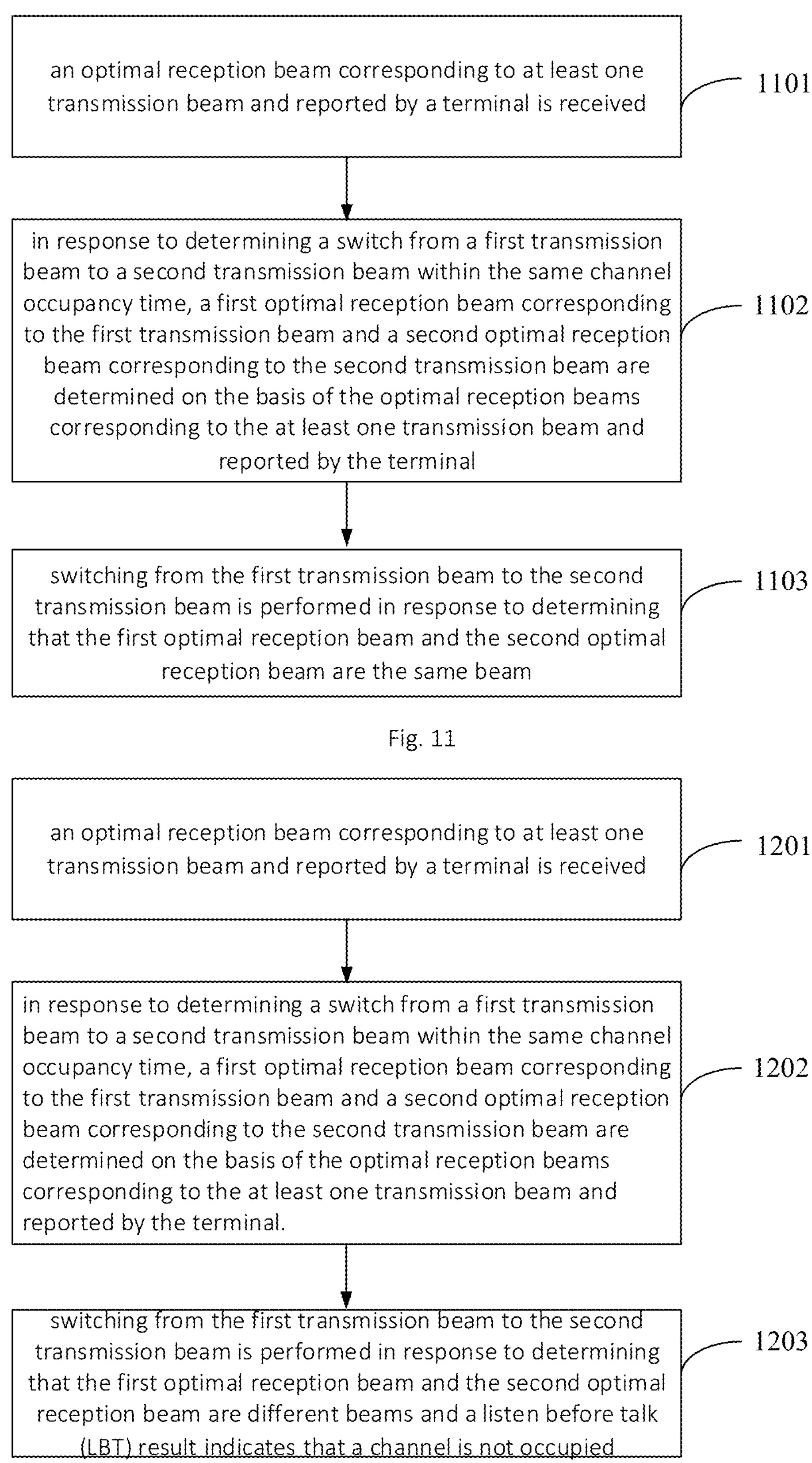
FIG. 12 is a schematic flowchart of another beam switching method shown according to an example.

In some alternative examples, with reference to FIG. 12, a flowchart of a beam switching method is shown according to an example. The method may be applied to a base station and may include steps 1201, 1202, and 1203.

Step 1201, an optimal reception beam corresponding to at least one transmission beam and reported by a terminal is received.

Step 1202, in response to determining a switch from a first transmission beam to a second transmission beam within the same channel occupancy time, a first optimal reception beam corresponding to the first transmission beam and a second optimal reception beam corresponding to the second transmission beam are determined on the basis of the optimal reception beams corresponding to the at least one transmission beam and reported by the terminal.

Step 1203, switching from the first transmission beam to the second transmission beam is performed in response to determining that the first optimal reception beam and the second optimal reception beam are different beams and a listen before talk (LBT) result indicates that a channel is not occupied.

In the above example, the base station may determine whether to perform beam switching on the basis of the LBT result under the condition that the base station determines that the optimal reception beams corresponding to the transmission beams before and after switching are different on the basis of reporting from a terminal side. Thus, the objective of beam switching is also realized, with the great simplicity and high availability.

In some alternative examples, with reference to FIG. 13, a flowchart of a beam switching method is shown according to an example. The method may be applied to a base station and may include step 1301 and step 1302.

Step 1301, reporting indication information is sent to a terminal.

The reporting indication information is configured to indicate at least one of the following: whether to report first indication information of an optimal reception beam corresponding to at least one transmission beam; and/or a target number of the transmission beam reported each time.

Step 1302, the optimal reception beam corresponding to the at least one transmission beam and reported by the terminal is received.

Optional, the base station may receive the optimal reception beam corresponding to the at least one transmission beam and reported by the terminal under the condition that the reporting indication information indicates that the optimal reception beam corresponding to the at least one transmission beam is to be reported.

Alternatively, the base station may receive optimal reception beams corresponding to the target number of transmission beams and reported by the terminal under the condition that the reporting indication information indicates the target number of the transmission beam reported each time.

Alternatively, the base station may receive optimal reception beams corresponding to the target number of transmission beams and reported by the terminal under the condition that the reporting indication information indicates that the optimal reception beam corresponding to the at least one transmission beam is to be reported, and the target number of the transmission beam reported each time.

If the reporting indication information does not indicate reporting, the base station will not receive the optimal reception beam corresponding to the at least one transmission beam and reported by the terminal.

Step 1301 may be implemented alone or along with step 1302. Alternatively, steps 1301 and 1302 are implemented in combination with steps 1102 and 1103. Alternatively, steps 1301 and 1302 are implemented in combination with steps 1202 and 1203, which will not be limited in the disclosure.

In the above example, the base station may instruct the terminal to report or not to report the optimal reception beam corresponding to the at least one transmission beam through the reporting indication information, or instruct the terminal to report the optimal reception beams corresponding to the target number of transmission beams through the reporting indication information. In one embodiment, the base station may perform beam switching on the basis of reporting by the terminal, with the great simplicity and high availability.

In some alternative examples, with reference to FIG. 14, a flowchart of a beam switching method is shown according to an example. The method may be applied to a base station and may include steps 1401 and 1402.

Step 1401, first RRC signaling including a first information element is sent to a terminal, where the first information element includes a first identifier.

The first information element is an information element configured to configure CSI reporting. The first identifier is configured to indicate whether to report an optimal reception beam corresponding to at least one transmission beam. The base station may indicate whether the terminal reports first indication information of the optimal reception beam corresponding to the at least one transmission beam through the first identifier in the first information element in first RRC signaling.

In a possible embodiment, the first identifier is configured to instruct the terminal to report the optimal reception beam corresponding to the at least one transmission beam when being a first preset value. The first preset value may be one or zero, which will not be limited in the disclosure.

In another possible embodiment, the first identifier is configured to instruct the terminal not to report the optimal reception beam corresponding to the at least one transmission beam when being a second preset value. The second preset value is different from the first preset value. When the first preset value is 1, the second preset value may be zero, and vice versa.

Step 1402, the optimal reception beam corresponding to the at least one transmission beam and reported by the terminal is received.

Step 1401 may be implemented alone or along with step 1402. Alternatively, steps 1401 and 1402 are implemented in combination with steps 1102 and 1103. Alternatively, steps 1401 and 1402 are implemented in combination with steps 1202 and 1203, which will not be limited in the disclosure.

In the above example, the base station may instruct the terminal to report or not to report the optimal reception beam corresponding to the at least one transmission beam through the first identifier in first RRC signaling. Further in one embodiment, the base station may perform beam switching on the basis of reporting by the terminal, with the great simplicity and high availability.

In some alternative examples, with reference to FIG. 15, a flowchart of a beam switching method is shown according to an example. The method may be applied to a base station and may include steps 1501 and 1502.

Step 1501, second RRC signaling including a second information element and a first information element associated with the second information element is sent to a terminal.

The second information element may be an information element configured to configure a non-zero power CSI reference signal resource set, for example, an NZP-CSI-RS-resource set information element. The first information element may be an information element configured to configure CSI reporting, i.e., a CSI-report config information element. The first information element associated with the second information element indicates that if a CIS reference signal configured for the second information element is assumed to be a CSI-RS #n resource set, the first information element associated is also configured to configure CIS-RS #n reporting. The first information element and the second information element jointly indicate whether to report the optimal reception beam corresponding to the at least one transmission beam.

In a possible embodiment, the first information element and the second information element are configured to instruct the terminal to report the optimal reception beam corresponding to the at least one transmission beam when a first parameter in the second information element is configured as ON and a second parameter in the first information element is not configured as none. The first parameter in the second information element may be a REPETITIN parameter, and the second parameter may be a reportQuanity parameter.

In another possible embodiment, the first information element and the second information element are configured to instruct the terminal not to report the optimal reception beam corresponding to the at least one transmission beam when a first parameter in the second information element is configured as ON, and a second parameter in the first information element is configured as none. The first parameter in the second information element may be a REPETITIN parameter, and the second parameter may be a reportQuanity parameter.

Step 1502, the optimal reception beam corresponding to the at least one transmission beam and reported by the terminal is received.

Step 1501 may be implemented alone or along with step 1502. Specifically, it is required to determine whether to implement steps 1501 and 1502 together according to a content indicated by report indication information. Alternatively, steps 1501 and 1502 are implemented in combination with steps 1102 and 1103. Alternatively, steps 1501 and 1502 are implemented in combination with steps 1202 and 1203, which will not be limited in the disclosure.

In the above example, the base station may instruct the terminal to report or not to report the optimal reception beam corresponding to the at least one transmission beam by reusing an existing identifier in second RRC signaling. Further in one embodiment, the base station may perform beam switching on the basis of reporting by the terminal, with the great simplicity and high availability.

Figures 16, 17:
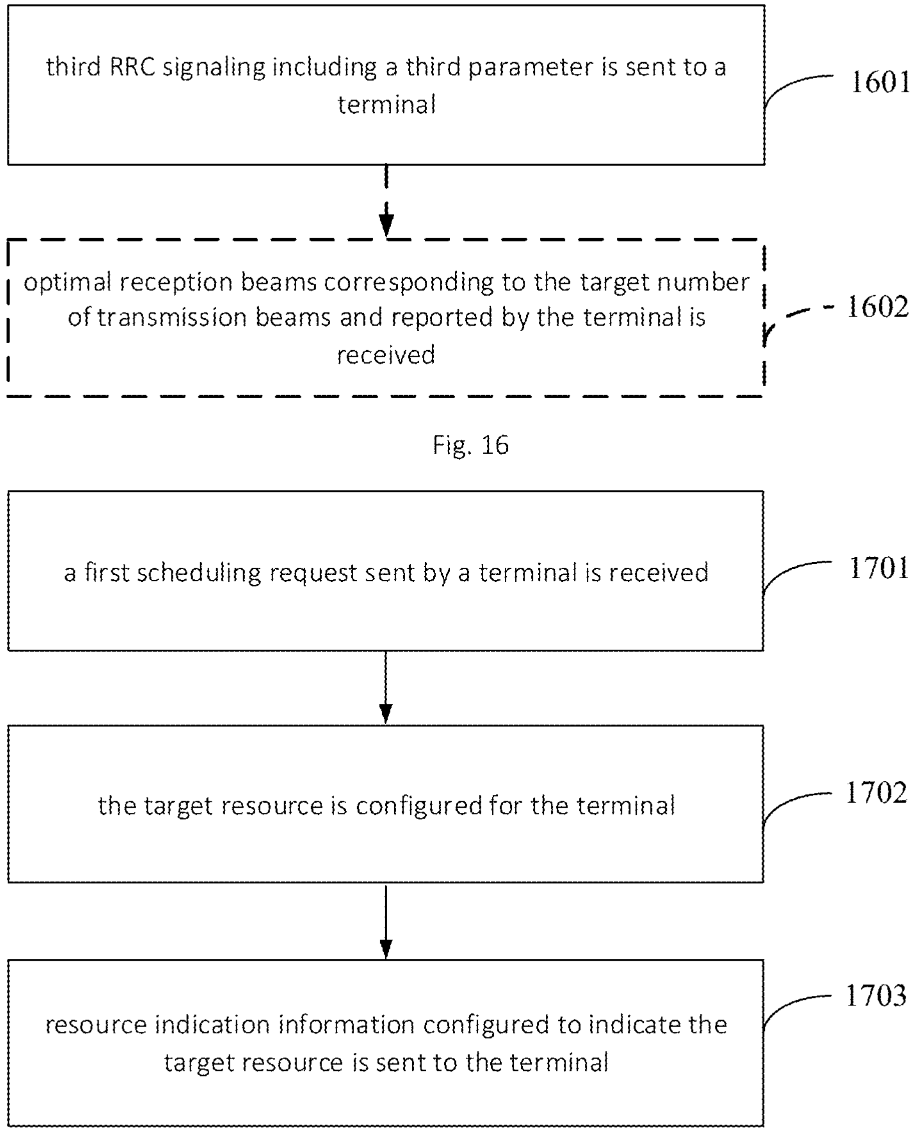
FIG. 16 is a schematic flowchart of yet another beam switching method shown according to an example.
FIG. 17 is a schematic flowchart of yet another beam switching method shown according to an example.

In some alternative examples, with reference to FIG. 16, a flowchart of a beam switching method is shown according to an example. The method may be applied to a base station and may include steps 1601 and 1602.

Step 1601, third RRC signaling including a third parameter is sent to a terminal.

In the example of the disclosure, the third parameter is a parameter configured to indicate a target number. Alternatively, the third parameter is a designated parameter reused by a target number. In one embodiment, the designated parameter may be a nroReportedRS parameter. Third RRC signaling may be the same RRC signaling as first RRC signaling or not. Alternatively, third RRC signaling may be the same RRC signaling as second RRC signaling or not.

Step 1602, optimal reception beams corresponding to the target number of transmission beams and reported by the terminal is received.

Step 1602 is also optional. After receiving third RRC signaling and determining the optimal reception beams corresponding to the target number of transmission beams, the terminal may report to the base station. The terminal may also be required to send the optimal reception beams corresponding to the target number of transmission beams to the base station in response to determining that the terminal is allowed to report on the basis of reporting indication information sent by the base station.

In one embodiment, steps 1601 and 1602 may be implemented in combination with steps 1102-1103. Alternatively, steps 1601 and 1602 may be implemented in combination with steps 1202-1203, which will not be limited in the disclosure.

In the above example, the base station may instruct the terminal to determine the optimal reception beams corresponding to the target number of transmission beams through the third parameter in third RRC signaling, with the great simplicity and high availability.

In some alternative examples, with reference to FIG. 17, a flowchart of a beam switching method is shown according to an example. The method may be applied to a base station and may include steps 1701, 1702 and 1703.

Step 1701, a first scheduling request sent by a terminal is received.

In the example of the disclosure, the first scheduling request is configured to request the base station to configure a target resource configured to report an optimal reception beam corresponding to at least one transmission beam for the terminal.

Step 1702, the target resource is configured for the terminal.

Step 1703, resource indication information configured to indicate the target resource is sent to the terminal.

In the example of the disclosure, steps 1701-1703 may be implemented together instead of being implemented along with other steps provided by the disclosure. Steps 1701-1703 may also be implemented in combination with steps 1101-1103. That is, step 1101 starts to be executed after step 1703 is completed until step 1103 is completed. Alternatively, steps 1701-1703 may also be implemented in combination with steps 1201-1203, which will not be limited in the disclosure.

In the above example, the base station may configure the target resource configured to send the optimal reception beam corresponding to the at least one transmission beam for the terminal on the basis of the first scheduling request sent by the terminal. The terminal then reports the optimal reception beam corresponding to the at least one transmission beam. Also, the base station may perform beam switching on the basis of reporting from a terminal side, with the high availability.

Figure 18:
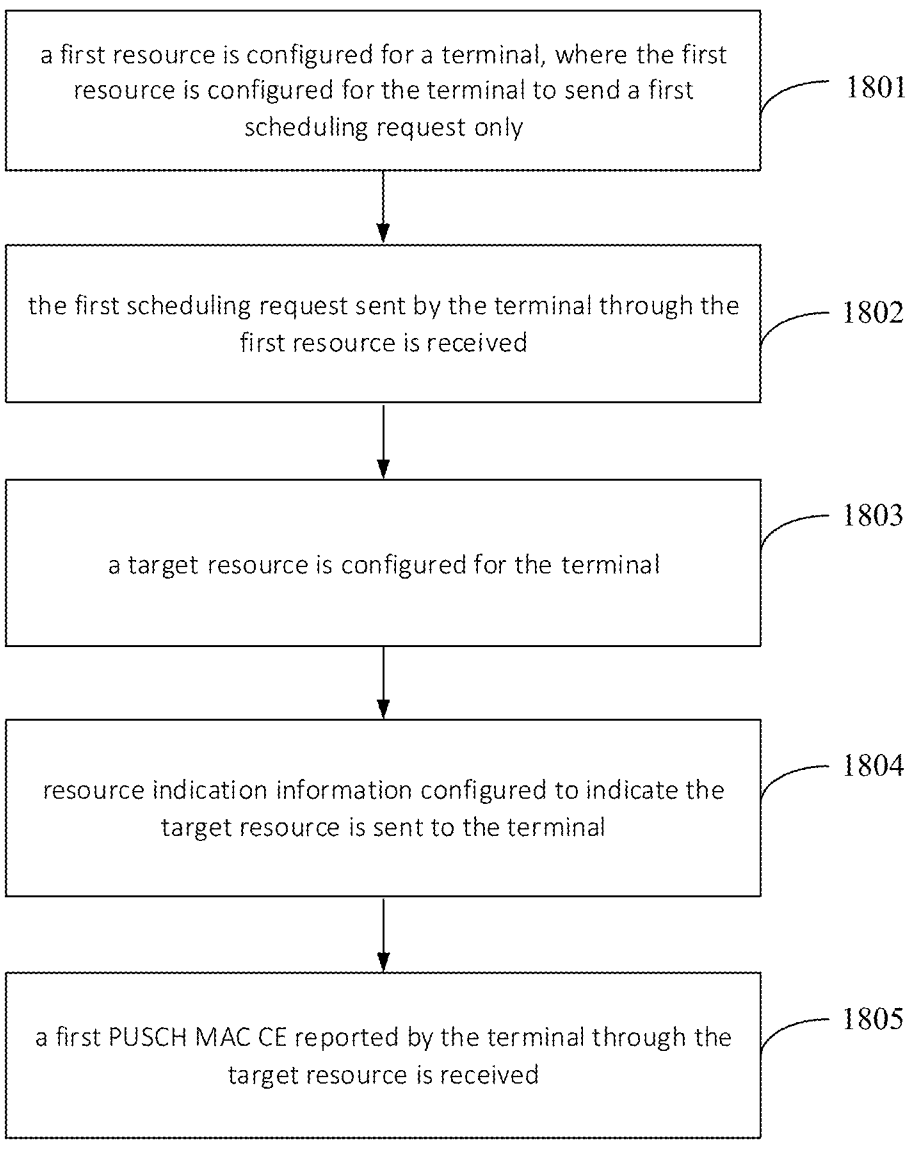
FIG. 18 is a schematic flowchart of yet another beam switching method shown according to an example.

In some alternative examples, with reference to FIG. 18, a flowchart of a beam switching method is shown according to an example. The method may be applied to a base station and may include steps 1801, 1802, 1803, 1804, and 1805.

Step 1801, a first resource is configured for a terminal, where the first resource is configured for the terminal to send a first scheduling request only.

Step 1802, the first scheduling request sent by the terminal through the first resource is received.

Step 1803, a target resource is configured for the terminal.

Step 1804, resource indication information configured to indicate the target resource is sent to the terminal.

Step 1805, a first PUSCH MAC CE reported by the terminal through the target resource is received.

Specifically, the first PUSCH MAC CE at least includes: identification information of at least one transmission beam and an index value of an optimal reception beam corresponding to the at least one transmission beam. The identification information of the transmission beam includes at least one of the following: a CSI reference signal resource indicator corresponding to the transmission beam; and/or a synchronization signal block resource indicator corresponding to the transmission beam.

In one embodiment, after receiving the first PUSCH MAC CE, in the case of performing beam switching, the base station may determine whether optimal reception beams corresponding to transmission beams before and after switching are the same beam. If the optimal reception beams are the same beam, beam switching may be performed directly. If the optimal reception beams are different beams, the base station may determine whether to perform beam switching on the basis of an LBT result.

In the above example, the base station may configure the first resource specifically configured to send the optimal reception beam corresponding to the at least one transmission beam for the terminal, so that the terminal sends the first scheduling request. The base station configures the target resource for the terminal on the basis of the first scheduling request. Further, the base station may perform beam switching on the basis of reporting from a terminal side without detecting a channel occupancy condition when transmission beam switching is performed each time. Accordingly, the time overload of beam switching within the same channel occupancy time is reduced, with the high availability.

Figure 19:
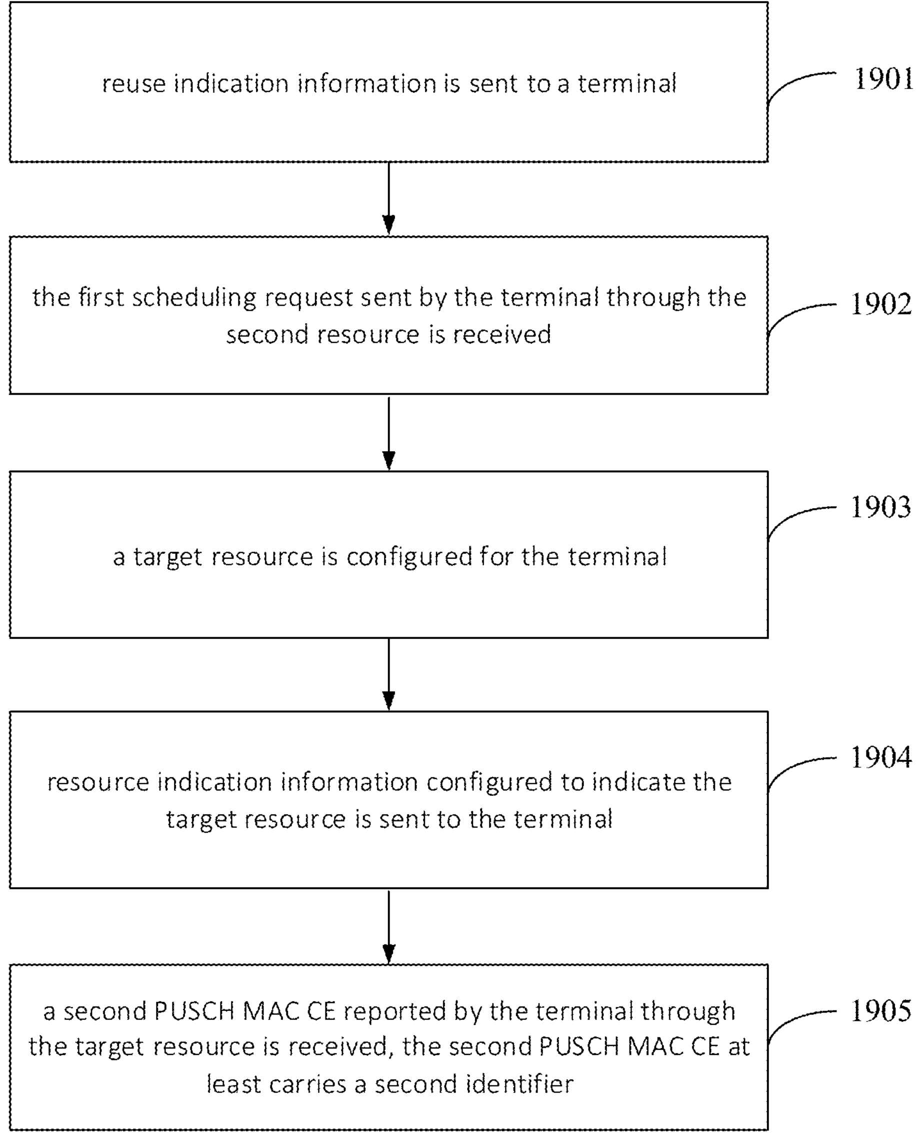
FIG. 19 is a schematic flowchart of yet another beam switching method shown according to an example.

In some alternative examples, with reference to FIG. 19, a flowchart of a beam switching method is shown according to an example. The method may be applied to a base station and may include steps 1901, 1902, 1903, 1904, and 1905.

Step 1901, reuse indication information is sent to a terminal.

The reuse indication information is configured to indicate that a second resource reuses a designated resource pre-allocated to the terminal. The second resource is a resource for the terminal to send a first scheduling request. The designated resource is a resource for the terminal to send a second scheduling request.

In one embodiment, the second scheduling request may be a BFR scheduling request of an Scell, etc., which will not be limited in the disclosure.

Step 1902, the first scheduling request sent by the terminal through the second resource is received.

Step 1903, a target resource is configured for the terminal.

Step 1904, resource indication information configured to indicate the target resource is sent to the terminal.

Step 1905, a second PUSCH MAC CE reported by the terminal through the target resource is received, the second PUSCH MAC CE at least carries a second identifier.

The second identifier may be configured to indicate that an information content is the optimal reception beam corresponding to the at least one transmission beam. In one embodiment, the second PUSCH MAC CE further includes: identification information of the at least one transmission beam and an index value of the optimal reception beam corresponding to the at least one transmission beam. The identification information of the transmission beam includes at least one of the following: a CSI reference signal resource indicator corresponding to the transmission beam; and/or a synchronization signal block resource indicator corresponding to the transmission beam.

In one embodiment, after receiving the second PUSCH MAC CE, in the case of performing beam switching by determining the information content carried by the second PUSCH MAC CE according to the second identifier, the base station may determine whether optimal reception beams corresponding to transmission beams before and after switching are the same beam. If the optimal reception beams are the same beam, beam switching may be performed directly. If the optimal reception beams are different beams, the base station may determine whether to perform beam switching on the basis of an LBT result.

In the above example, the base station may instruct the terminal to reuse a second resource configured to send the second scheduling request, so that the terminal sends the first scheduling request. The base station configures the target resource for the terminal on the basis of the first scheduling request. Further, the base station may perform beam switching on the basis of reporting from a terminal side without detecting a channel occupancy condition when transmission beam switching is performed each time. Accordingly, the time overload of beam switching within the same channel occupancy time is reduced, with the high availability.

In some alternative examples, the base station receives the identification information of the at least one transmission beam and the index value of the optimal reception beam corresponding to the at least one transmission beam that are reported by the terminal. The identification information of the transmission beam includes at least one of the following: the CSI reference signal resource indicator corresponding to the transmission; and/or the synchronization signal block resource indicator corresponding to the transmission beam.

Figure 20:
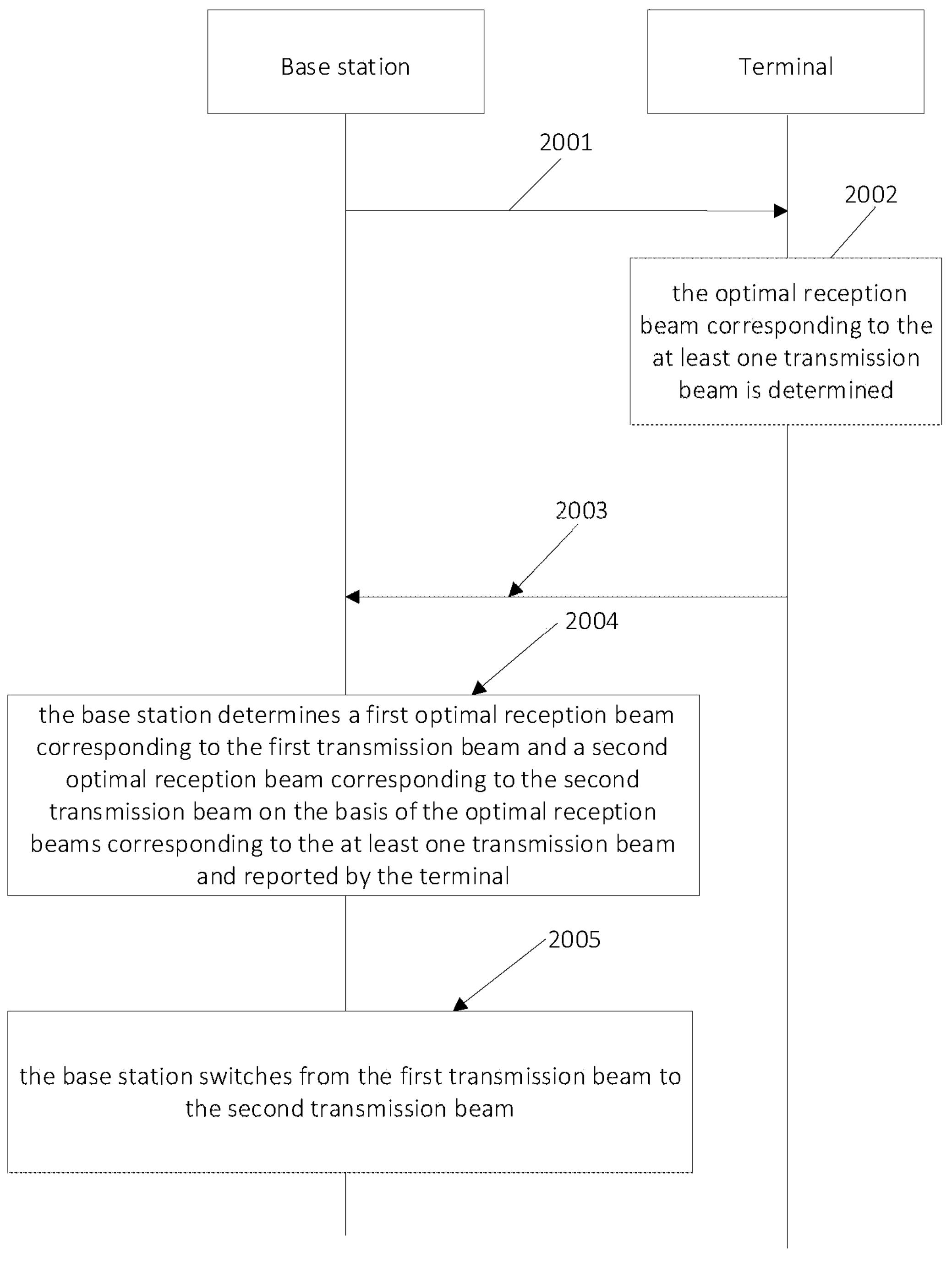
FIG. 20 is a schematic flowchart of yet another beam switching method shown according to an example.

In some alternative examples, with reference to FIG. 20, a flowchart of a beam switching method is shown according to an example. The method may include steps 2001, 2002, 2003, 2004, and 2005.

Step 2001, a base station sends reporting indication information to a terminal.

The reporting indication information is configured to indicate at least one of the following: whether to report an optimal reception beam corresponding to at least one transmission beam; and/or a target number of the transmission beam reported each time.

Step 2002, the optimal reception beam corresponding to the at least one transmission beam is determined.

Step 2003, the terminal reports the optimal reception beam corresponding to the at least one transmission beam to the base station on the basis of the reporting indication information.

Step 2004, in response to determining a switch from a first transmission beam to a second transmission beam within the same channel occupancy time, the base station determines a first optimal reception beam corresponding to the first transmission beam and a second optimal reception beam corresponding to the second transmission beam on the basis of the optimal reception beams corresponding to the at least one transmission beam and reported by the terminal.

Step 2005, the base station switches from the first transmission beam to the second transmission beam in response to determining that the first optimal reception beam and the second optimal reception beam are the same beam.

Alternatively, step 2005 may be replaced by step 2005' (not shown in FIG. 20) of switching from the first transmission beam to the second transmission beam in response to determining that the first optimal reception beam and the second optimal reception beam are different beams and a listen before talk (LBT) result indicates that a channel is not occupied.

With reference to FIG. 21, before the channel occupancy time starts, the base station 2101 may perform LBT first, and then the channel occupancy time may start under the condition that an LBT result indicates that a channel is not occupied.

Or in one embodiment, the terminal 2102 may also perform assisted LBT, i.e., receiver assisted LBT. The channel occupancy time may start under the condition that LBT results of the base station 2101 and the terminal 2102 indicate that a channel is not occupied.

After the channel occupancy time starts, the base station 2101 is required to switch from transmission beam #1 to transmission beam #2. The base station 2101 determines that optimal reception beams corresponding to transmission beam #1 and transmission beam #2 are reception beam #2. Thus, the base station 2101 may switch from transmission beam #1 to transmission beam #2 directly without performing LBT. If the base station 2101 is required to switch from transmission beam #1 to transmission beam #3, the base station 2101 determines that optimal reception beams corresponding to transmission beam #1 and transmission beam #3 are reception beam #2 and reception beam #3 respectively. The base station 2101 is required to switch from transmission beam #1 to transmission beam #3 in response to determining that a channel is not occupied on the basis of the LBT result.

In the example, the terminal may determine the optimal reception beam corresponding to the at least one transmission beam and report the optimal reception beam corresponding to the at least one transmission beam to the base station. A base station side may determine to perform beam switching within the same channel occupancy time on the basis of reporting from a terminal side. If an optimal reception beam corresponding to a transmission beam after switching is consistent with an optimal reception beam corresponding to a transmission beam before switching, the base station may perform beam switching directly without detecting a channel occupancy condition each time of transmission beam switching. Accordingly, the time overload of beam switching within the same channel occupancy time is reduced, with the high availability.

Figure 22:
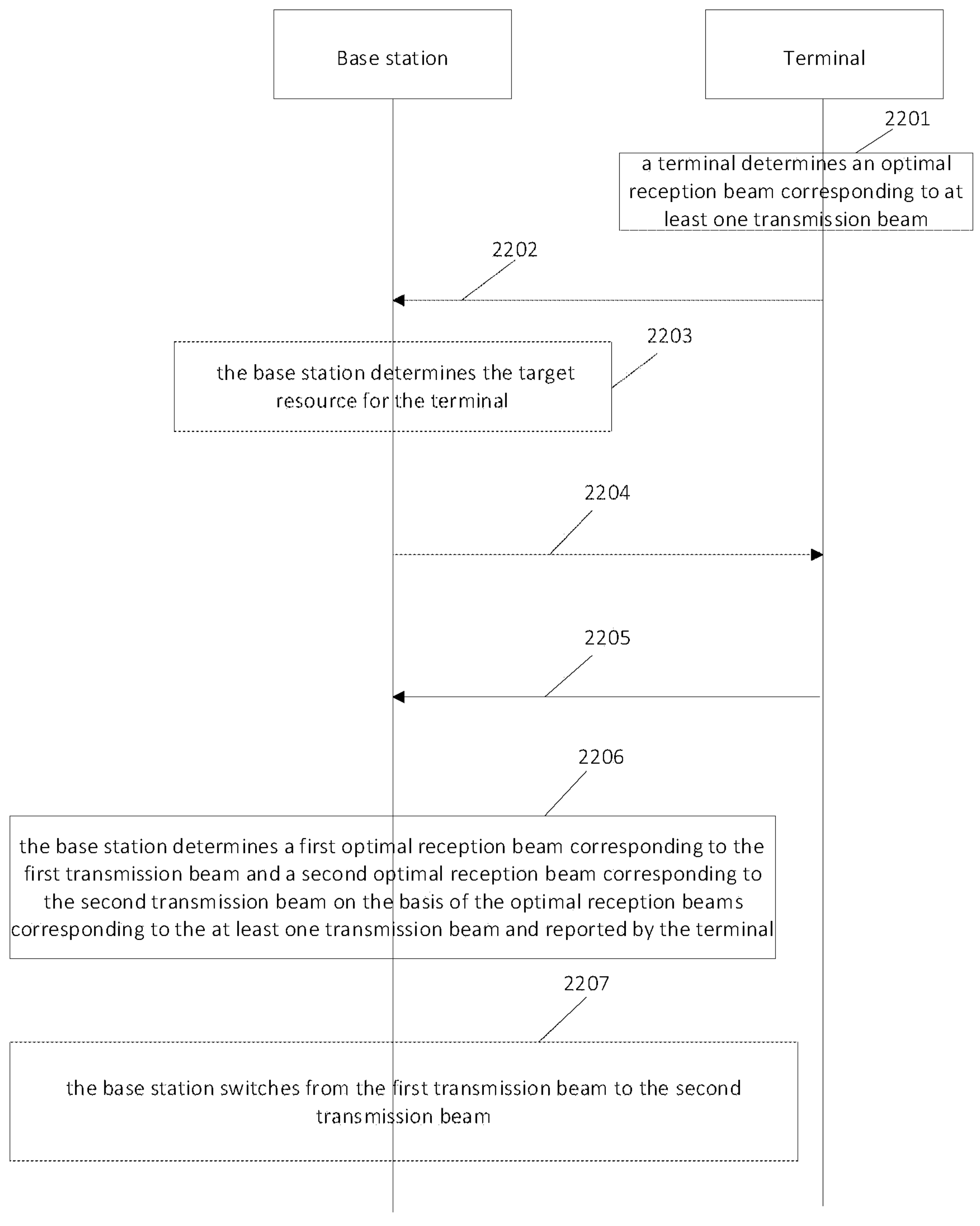
FIG. 22 is a schematic flowchart of still another beam switching method shown according to an example.

In some alternative examples, with reference to FIG. 22, a flowchart of a beam switching method is shown according to an example. The method may be applied to a base station and may include steps 2201 through 2207.

Step 2201, a terminal determines an optimal reception beam corresponding to at least one transmission beam.

Step 2202, the terminal sends a first scheduling request to the base station.

The first scheduling request is configured to request the base station to configure a target resource configured to report the optimal reception beam corresponding to the at least one transmission beam for the terminal.

Step 2203, the base station determines the target resource for the terminal.

Step 2204, the base station sends resource indication information configured to indicate the target resource to the terminal.

Step 2205, the terminal reports the optimal reception beam corresponding to the at least one transmission beam to the base station through the target resource.

Step 2206, in response to determining a switch from a first transmission beam to a second transmission beam within the same channel occupancy time, the base station determines a first optimal reception beam corresponding to the first transmission beam and a second optimal reception beam corresponding to the second transmission beam on the basis of the optimal reception beams corresponding to the at least one transmission beam and reported by the terminal.

Step 2207, the base station switches from the first transmission beam to the second transmission beam in response to determining that the first optimal reception beam and the second optimal reception beam are the same beam.

Alternatively, step 2207 may be replaced by step 2207' (not shown in FIG. 22) of switching from the first transmission beam to the second transmission beam in response to determining that the first optimal reception beam and the second optimal reception beam are different beams and a listen before talk (LBT) result indicates that a channel is not occupied.

Similarly, a beam switching process is similar with the process shown in FIG. 21, which will not be repeated here.

In the example, the terminal may determine the optimal reception beam corresponding to the at least one transmission beam and report the optimal reception beam corresponding to the at least one transmission beam to the base station. A base station side may determine to perform beam switching within the same channel occupancy time on the basis of reporting from a terminal side. If an optimal reception beam corresponding to a transmission beam after switching is consistent with an optimal reception beam corresponding to a transmission beam before switching, the base station may perform beam switching directly without detecting a channel occupancy condition each time of transmission beam switching. Accordingly, the time overload of beam switching within the same channel occupancy time is reduced, with the high availability.

Corresponding to the foregoing example of an application function implementation method, an example of an application function implementation apparatus is further provided in the disclosure.

Figure 23:
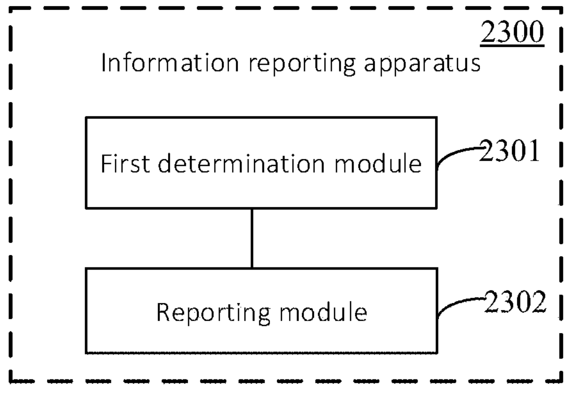
FIG. 23 is a block diagram of an information reporting apparatus shown according to an example.

With reference to FIG. 23, a block diagram of an information reporting apparatus 2300 is shown according to an example. The information reporting apparatus 2300 is applied to a terminal and includes a first determination module 2301 and a reporting module 2302.

The first determination module 2301 configured to determine an optimal reception beam corresponding to at least one transmission beam.

The reporting module 2302 configured to report the optimal reception beam corresponding to the at least one transmission beam to a base station.

In some alternative examples, the apparatus further includes:

a second reception module configured to receive reporting indication information sent by the base station, where the reporting indication information is configured to indicate at least one of the following:

whether to report the optimal reception beam corresponding to the at least one transmission beam; and/or a target number of the transmission beam reported each time.

The particular embodiment is similar with the embodiment in the example shown in FIG. 2, which will not be repeated here.

In some alternative examples, the reporting module is further configured to:

report the optimal reception beam corresponding to the at least one transmission beam to the base station in response to determining that the reporting indication information indicates that the optimal reception beam corresponding to the at least one transmission beam is to be reported.

The particular embodiment is similar with the embodiment in the example shown in FIG. 3, which will not be repeated here.

In some alternative examples, the first determination module is further configured to:

determine that the reporting indication information indicates that the optimal reception beam corresponding to the at least one transmission beam is to be reported in response to determining a first identifier in a first information element in first RRC signaling received as a first preset value, where the first information element is an information element configured to configure channel state information (CSI) reporting, and the first identifier is an identifier configured to indicate whether to report the optimal reception beam corresponding to the at least one transmission beam.

The particular embodiment is similar with the embodiment in the example shown in FIG. 4, which will not be repeated here.

In some alternative examples, the first determination module is further configured to:

determine that the reporting indication information indicates that the optimal reception beam corresponding to the at least one transmission beam is to be reported in response to determining that a first parameter in a second information element in second RRC signaling received is configured as ON and a second parameter in a first information element associated with the second information element is not configured as none.

The first information element is an information element configured to configure CSI reporting, and the second information element is an information element configured to configure a non-zero power CSI reference signal resource set.

The particular embodiment is similar with the embodiment in the example shown in FIG. 5, which will not be repeated here.

In some alternative examples, the apparatus further includes:

a third determination module configured to determine a target number indicated by the reporting indication information on the basis of a third parameter in third RRC signaling received.

The third parameter is a parameter configured to indicate the target number. Alternatively, the third parameter is a designated parameter reused by the target number.

In one embodiment, the step of reporting the optimal reception beam corresponding to the at least one transmission beam to a base station includes:

in response to determining that the target number indicated by the reporting indication information is one and each time after an optimal reception beam corresponding to one transmission beam is determined, the optimal reception beam corresponding to the transmission beam is reported to the base station.

In one embodiment, the step of reporting the optimal reception beam corresponding to the at least one transmission beam to a base station includes:

in response to determining that the target number indicated by the reporting indication information is a plural number and after optimal reception beams corresponding to the target number of transmission beams respectively are determined, the optimal reception beams corresponding to the target number of transmission beams respectively are reported to the base station.

The particular embodiment is similar with the embodiments in the examples shown in FIGS. 6 and 7, which will not be repeated here.

In some alternative examples, the reporting module is further configured to:

report the optimal reception beam corresponding to the at least one transmission beam to the base station through at least one of a physical uplink control channel (PUCCH) resource and a physical uplink shared channel (PUSCH) resource.

In the above example, the terminal may report identification information of the at least one transmission beam and an index value of the optimal reception beam corresponding to the at least one transmission beam to the base station through the PUCCH resource and/or a PUSCH resource. The base station may perform beam switching on the basis of a content reported from a terminal side, with the great simplicity and high availability.

In some alternative examples, the apparatus further includes:

a first sending module configured to send a first scheduling request to the base station, where the first scheduling request is configured to request the base station to configure a target resource configured to report the optimal reception beam corresponding to the at least one transmission beam for the terminal; and a third reception module configured to receive resource indication information configured to indicate the target resource and sent by the base station.

The reporting module is further configured to:

report the optimal reception beam corresponding to the at least one transmission beam to the base station through the target resource on the basis of the resource indication information.

The particular embodiment is similar with the embodiment in the example shown in FIG. 8, which will not be repeated here.

In some alternative examples, the first sending module is further configured to:

send the first scheduling request to the base station on a first resource configured by the base station for the terminal, where the first resource is configured for the terminal to send the first scheduling request only.

In one embodiment, the reporting module is further configured to:

report the optimal reception beam corresponding to the at least one transmission beam to the base station through a first PUSCH media access control control element (MAC CE) on the target resource on the basis of the resource indication information.

The particular embodiment is similar with the embodiment in the example shown in FIG. 9, which will not be repeated here.

In some alternative examples, the first sending module is further configured to:

determine a second resource configured to send the first scheduling request on the basis of reuse indication information sent by the base station, where the reuse indication information is configured to indicate that the second resource reuses a designated resource pre-allocated to the terminal, and the designated resource is a resource for the terminal to send a second scheduling request; and send the first scheduling request to the base station on the second resource.

In one embodiment, the reporting module is further configured to:

report the optimal reception beam corresponding to the at least one transmission beam to the base station through a second PUSCH MAC CE on the target resource on the basis of the resource indication information, where the second PUSCH MAC CE at least carries a second identifier, and the second identifier is configured to indicate that an information content reported through the second PUSCH MAC CE is the optimal reception beam corresponding to the at least one transmission beam.

The particular embodiment is similar with the embodiment in the example shown in FIG. 10, which will not be repeated here.

In some alternative examples, the reporting module is further configured to:

report identification information of the at least one transmission beam and an index value of the optimal reception beam corresponding to the at least one transmission beam to the base station.

In one embodiment, the identification information of the transmission beam includes at least one of the following:

a CSI reference signal resource indicator corresponding to the transmission beam; and/or a synchronization signal block resource indicator corresponding to the transmission beam.

Figure 24:
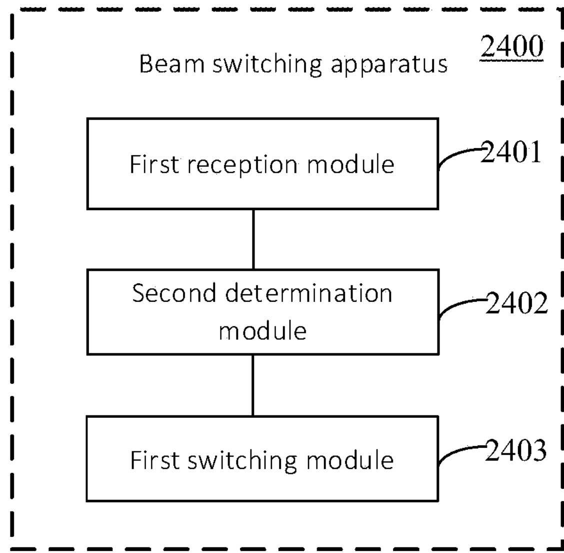
FIG. 24 is a block diagram of a beam switching apparatus shown according to an example.

With reference to FIG. 24, a block diagram of an information reporting apparatus 2400 is shown according to an example. The information reporting apparatus 2400 is applied to a base station and includes a first reception module 2401, a second determination module 2402, and a first switching module 2403.

The first reception module 2401 configured to receive an optimal reception beam corresponding to at least one transmission beam and reported by a terminal.

The second determination module 2402 configured to determine, in response to determining a switch from a first transmission beam to a second transmission beam within the same channel occupancy time, a first optimal reception beam corresponding to the first transmission beam and a second optimal reception beam corresponding to the second transmission beam on the basis of the optimal reception beams corresponding to the at least one transmission beam and reported by the terminal.

The first switching module 2403 configured to switch from the first transmission beam to the second transmission beam in response to determining that the first optimal reception beam and the second optimal reception beam are the same beam.

The particular embodiment is similar with the embodiment in the example shown in FIG. 11, which will not be repeated here.

In some alternative examples, the apparatus further includes:

a second switching module configured to switch from the first transmission beam to the second transmission beam in response to determining that the first optimal reception beam and the second optimal reception beam are different beams and an LBT result indicates that a channel is not occupied.

The particular embodiment is similar with the embodiment in the example shown in FIG. 12, which will not be repeated here.

In one embodiment, the apparatus further includes:

a second sending module configured to send reporting indication information to the terminal, where the reporting indication information is configured to indicate at least one of the following:

whether to report first indication information of the optimal reception beam corresponding to the at least one transmission beam; and/or a target number of the transmission beam reported each time.

The particular embodiment is similar with the embodiment in the example shown in FIG. 13, which will not be repeated here.

In some alternative examples, the second sending module is further configured to:

send first RRC signaling including a first information element to the terminal, where the first information element includes a first identifier, the first information element is an information element configured to configure channel state information (CSI) reporting, and the first identifier is configured to indicate whether to report the optimal reception beam corresponding to the at least one transmission beam.

In one embodiment, the first identifier is configured to instruct the terminal to report the optimal reception beam corresponding to the at least one transmission beam when being a first preset value; and the first identifier is configured to instruct the terminal not to report the optimal reception beam corresponding to the at least one transmission beam when being a second preset value.

The particular embodiment is similar with the embodiment in the example shown in FIG. 14, which will not be repeated here.

In some alternative examples, the second sending module is further configured to:

send second RRC signaling including a second information element and a first information element associated with the second information element to the terminal, where the first information element is an information element configured to configure CSI reporting, the second information element is an information element configured to configure a non-zero power CSI reference signal resource set, and the first information element and the second information element are jointly configured to indicate whether to report the optimal reception beam corresponding to the at least one transmission beam.

In one embodiment, the first information element and the second information element are configured to instruct the terminal to report the optimal reception beam corresponding to the at least one transmission beam in response to determining that a first parameter in the second information element is configured as ON and a second parameter in the first information element is not configured as none; and the first information element and the second information element are configured to instruct the terminal not to report the optimal reception beam corresponding to the at least one transmission beam in response to determining that a first parameter in the second information element is configured as ON and a second parameter in the first information element is configured as none.

The particular embodiment is similar with the embodiment in the example shown in FIG. 15, which will not be repeated here.

In some alternative examples, the second sending module is further configured to:

send third RRC signaling including a third parameter to the terminal, where the third parameter is a parameter configured to indicate the target number; and alternatively, the third parameter is a designated parameter reused by the target number.

The particular embodiment is similar with the embodiment in the example shown in FIG. 16, which will not be repeated here.

In some alternative examples, the apparatus further includes:

a fourth reception module configured to receive a first scheduling request sent by the terminal, where the first scheduling request is configured to request the base station to configure a target resource configured to report the optimal reception beam corresponding to the at least one transmission beam for the terminal;

a first configuration module configured to configure the target resource for the terminal; and a third sending module configured to send resource indication information configured to indicate the target resource to the terminal.

The particular embodiment is similar with the embodiment in the example shown in FIG. 17, which will not be repeated here.

In some alternative examples, the apparatus further includes:

a second configuration module configured to configure a first resource for the terminal, where the first resource is configured for the terminal to send the first scheduling request only.

The particular embodiment is similar with the embodiment in the example shown in FIG. 18, which will not be repeated here.

In some alternative examples, the apparatus further includes:

a fourth sending module configured to send reuse indication information to the terminal, where the reuse indication information is configured to indicate that a second resource reuses a designated resource pre-allocated to the terminal, and the second resource is a resource for the terminal to send the first scheduling request, and the designated resource is a resource for the terminal to send a second scheduling request.

The particular embodiment is similar with the embodiment in the example shown in FIG. 19, which will not be repeated here.

In some alternative examples, the first reception module is further configured to:

receive identification information of the at least one transmission beam and an index value of the optimal reception beam corresponding to the at least one transmission beam that are reported by the terminal.

In one embodiment, the identification information of the transmission beam includes at least one of the following:

a CSI reference signal resource indicator corresponding to the transmission beam; and/or a synchronization signal block resource indicator corresponding to the transmission beam.

Since the apparatus example basically corresponds to the method example, reference may be made to some description of the method example for the relevant parts. The apparatus example described above is merely illustrative. The elements described as separate components may be physically separated or not. The component shown as an element may be a physical element or not. That is, the components may be positioned in one place or distributed over a plurality of network elements. Some or all modules may be selected as required actually to implement the solution of the disclosure. Those of ordinary skill in the art can understand and implement the disclosure without creative efforts.

Correspondingly, the disclosure further provides a non-transitory computer-readable storage medium. The non-transitory computer-readable storage medium stores a computer program, where the computer program is configured to execute any one of the information reporting methods applied to a terminal side.

Correspondingly, the disclosure further provides a non-transitory computer-readable storage medium. The non-transitory computer-readable storage medium stores a computer program, where the computer program is configured to execute any one of the beam switching methods applied to a base station side.

Correspondingly, the disclosure further provides an information reporting apparatus. The information reporting apparatus includes:

a processor; and a memory configured to store a processor-executable instruction; where the processor is configured to execute any one of the information reporting methods.

Figure 25:
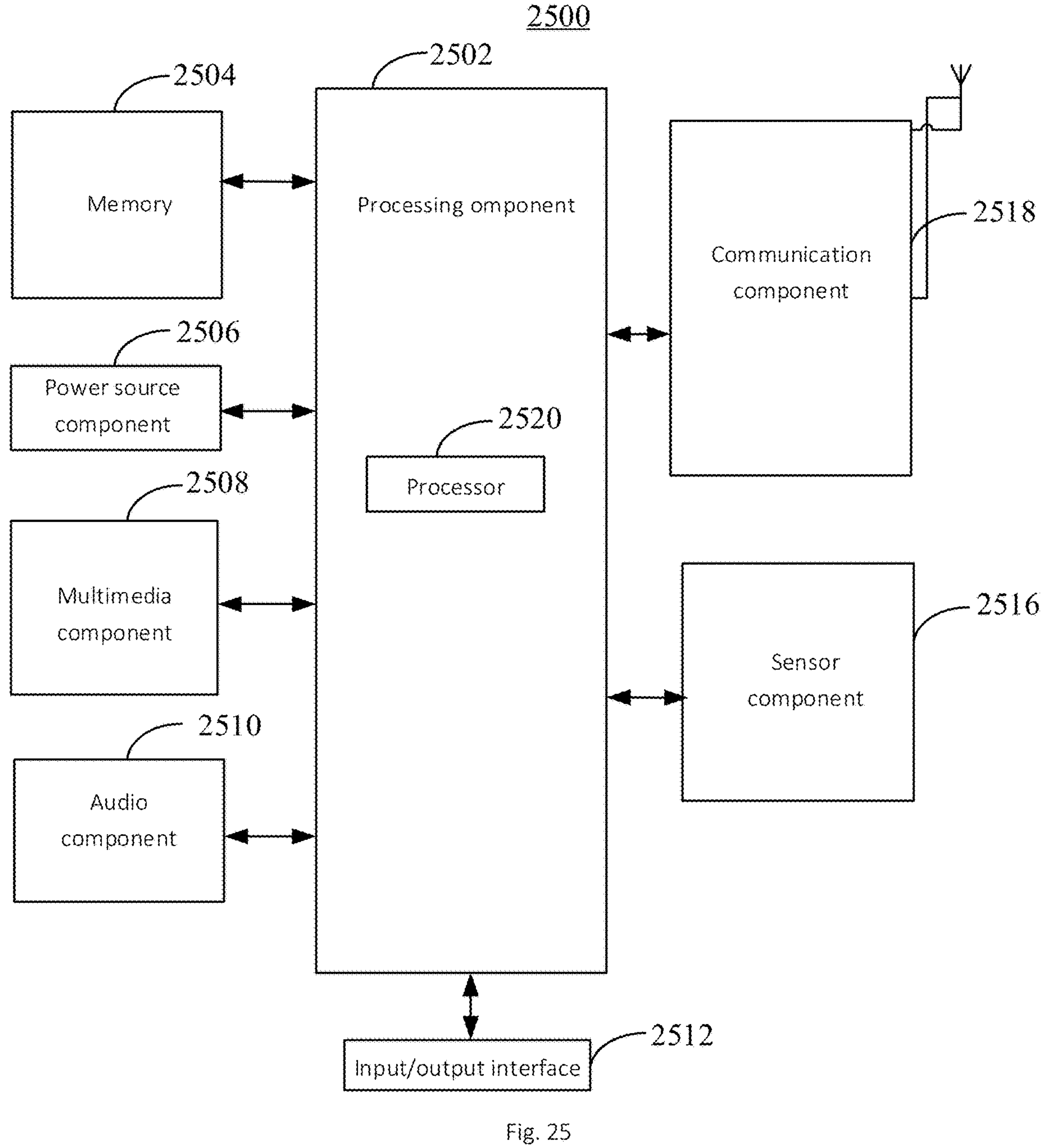
FIG. 25 is a schematic structural diagram of an information reporting apparatus shown according to an example.

FIG. 25 is a block diagram of an apparatus 2500 for information reporting according to an example. For example, the apparatus 2500 may be a mobile phone, a tablet computer, an e-book reader, a multimedia playing device, a wearable device, vehicle-mounted user equipment, an iPad, or a smart television.

With reference to FIG. 25, the apparatus 2500 may include one or more of the following components: a processing component 2502, a memory 2504, a power source component 2506, a multimedia component 2508, an audio component 2510, an input/output (I/O) interface 2512, a sensor component 2516, and a communication component 2518.

The processing component 2502 generally controls overall operations of the apparatus 2500, for example, operations associated with display, phone calls, random data access, camera operations, and recording operations. The processing component 2502 may include one or more processors 2520 to execute instructions, so as to complete all or some steps of the information reporting method. In addition, the processing component 2502 may include one or more modules, so as to facilitate interaction between the processing component 2502 and other components. For example, the processing component 2502 may include a multimedia module, so as to facilitate interaction between the multimedia component 2508 and the processing component 2502. For another example, the processing component 2502 may read an executable instruction from the memory to implement the steps of the information reporting method according to each example.

The memory 2504 is configured to store various types of data, so as to support the operation of the apparatus 2500. Instances of these data include instructions configured for any application or method operating on the apparatus 2500, contact data, phonebook data, messages, pictures, video, etc. The memory 2504 may be implemented through any type of volatile or non-transitory storage devices or their combinations, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power source component 2506 provides power for various components of the apparatus 2500. The power source component 2506 may include a power source management system, one or more power sources, and other components associated with power generation, management, and distribution for the apparatus 2500.

The multimedia component 2508 includes a display screen that provides an output interface between the apparatus 2500 and a user. In some examples, the multimedia component 2508 includes a front-facing camera and/or a rear-facing camera. When the apparatus 2500 is in an operation mode, such as a photographing mode or a video mode, the front-facing camera and/or the rear-facing camera are/is capable of receiving external multimedia data. Each of the front-facing camera and the rear-facing camera may be a fixed optical lens system or have a focal length and an optical zoom capability.

The audio component 2510 is configured to output and/or input an audio signal. For example, the audio component 2510 includes a microphone (MIC) configured to receive external audio signals when the apparatus 2500 is in the operation mode, for example, a calling mode, a recording mode, and a speech recognition mode. The audio signal received may be further stored in the memory 2504 or sent via the communication component 2518. In some examples, the audio component 2510 further includes a speaker configured to output the audio signal.

The I/O interface 2512 provides an interface between the processing component 2502 and peripheral interface modules, which may be a keyboard, a click wheel, a button, etc. These buttons may include, but are not limited to, a home button, a volume button, a start button, and a lock button.

The sensor component 2516 includes one or more sensors configured to provide state assessments for various aspects of the apparatus 2500. For example, the sensor component 2516 may detect an on/off state of the apparatus 2500, and relative positioning of the components. For example, the components are a display and a keypad of the apparatus 2500. The sensor component 2516 may also detect a change in position of the apparatus 2500 or one component of the apparatus 2500, the presence or absence of contact between the user and the apparatus 2500, an orientation or an acceleration/deceleration of the apparatus 2500, and a change in temperature of the apparatus 2500. The sensor component 2516 may include a proximity sensor configured to detect the presence of a nearby object without any physical contact. The sensor component 2516 may further include light sensors, such as a complementary metal-oxide-semiconductor transistor (CMOS) or a charge coupled device (CCD) image sensor configured to be used in imaging application. In some examples, the sensor component 2516 may further include an acceleration sensor, a gyroscopic sensor, a magnetic sensor, a pressure sensor, or a temperature sensor.

The communication component 2518 is configured to facilitate wired or wireless communication between the apparatus 2500 and other devices. The apparatus 2500 may access a radio network based on a communication standard, such as a wireless fidelity (Wi-Fi) network, a 2nd generation (2G) network, a 3rd generation (3G) network, a 4th generation (4G) network, a 5th generation (5G) network, or a 6th generation (6G) network, or their combinations. In an example, the communication component 2518 receives a broadcast signal or broadcast related information from an external broadcast management system via a broadcast channel. In an example, the communication component 2518 further includes a near field communication (NFC) module to facilitate short-range communication. For example, the NFC module may be implemented on the basis of a radio frequency identification (RFID) technology, an infrared data association (IrDA) technology, an ultra wide band (UWB) technology, a Bluetooth (BT) technology, etc.

In an example, the apparatus 2500 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements configured to execute any one of the information reporting methods applied to a terminal side.

A non-transitory machine-readable storage medium including an instruction, such as a memory 2504 including an instruction is further provided in an example. The instruction may be executed by a processor 2520 of an apparatus 2500, so as to complete the information reporting method. For example, the non-transitory computer-readable storage medium may be an ROM, a random access memory (RAM), a compact disk read-only memory (CD-ROM), a magnetic tape, a floppy disc, an optical data storage device, etc.

Correspondingly, the disclosure further provides a beam switching apparatus. The beam switching apparatus includes:

a processor; and a memory configured to store a processor-executable instruction; where the processor is configured to execute any one of the beam switching methods.

Figure 26:
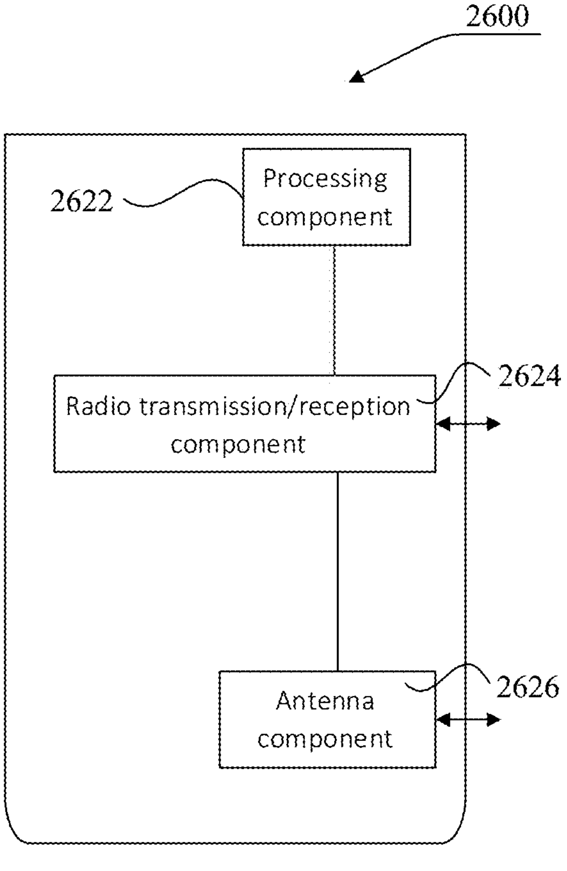
FIG. 26 is a schematic structural diagram of a beam switching apparatus shown according to an example.

With reference to FIG. 26, a schematic structural diagram of a beam switching apparatus 2600 shown according to an example is shown. The beam switching apparatus 2600 may be provided as a base station. With reference to FIG. 26, the beam switching apparatus 2600 includes a processing component 2622, a radio transmission/reception component 2624, an antenna component 2626, and a signal processing portion specific to a radio interface. The processing component 2622 may further include at least one processor.

One processor in the processing component 2622 may be configured to execute any one of the beam switching methods.

Those skilled in the art will readily conceive of other embodiments of the disclosure after considering the description and practicing the disclosure disclosed here. The disclosure is intended to cover any variations, uses, or adaptive changes of the disclosure that follow the general principles of the disclosure and include common general knowledge or customary technical means in the art not disclosed in the disclosure. The description and the examples are merely deemed illustrative, and the true scope and spirit of the disclosure are indicated by the following claims.

It should be understood that the disclosure is not limited to precise structures described above and shown in the accompanying drawings, and various modifications and changes can be made without departing from the scope of the disclosure. The scope of the disclosure is limited merely by the appended claims.

The invention claimed is:

1. An information reporting method comprising:

determining, by a terminal, an optimal reception beam corresponding to at least one transmission beam; and reporting, by the terminal, the optimal reception beam corresponding to the at least one transmission beam to a base station, so that in a case where the base station switches from a first transmission beam to a second transmission beam within a same channel occupancy time, and in a case where a first optimal reception beam corresponding to the first transmission beam and a second optimal reception beam corresponding to the second transmission beam are a same beam, the base station switches from the first transmission beam to the second transmission beam;

wherein the method further comprises:

sending, by the terminal, a first scheduling request to the base station on a first resource or a second resource; wherein the first scheduling request is configured to request the base station to configure a target resource configured to report the optimal reception beam corresponding to the at least one transmission beam for the terminal, the first resource is configured for the terminal to send the first scheduling request only, the second resource reuses a designated resource pre-allocated to the terminal, the designated resource is a resource for the terminal to send a second scheduling request, and the second scheduling request is a beam failure recovery (BFR) scheduling request for a secondary cell (Scell).

2. The information reporting method according to claim 1, further comprising:

receiving, by the terminal, reporting indication information from the base station, wherein the reporting indication information is configured to indicate at least one of:

whether to report the optimal reception beam corresponding to the at least one transmission beam; or a target number of the transmission beam reported each time.

3. The information reporting method according to claim 2, wherein reporting the optimal reception beam corresponding to the at least one transmission beam to the base station comprises:

reporting the optimal reception beam corresponding to the at least one transmission beam to the base station in response to determining that the reporting indication information indicates that the optimal reception beam corresponding to the at least one transmission beam is to be reported.

4. The information reporting method according to claim 3, wherein determining that the reporting indication information indicates that the optimal reception beam corresponding to the at least one transmission beam is to be reported comprises at least one of:

determining that the reporting indication information indicates that the optimal reception beam corresponding to the at least one transmission beam is to be reported in response to determining a first identifier in a first information element in first radio resource control (RRC) signaling received as a first preset value, wherein the first identifier is an identifier configured to indicate whether to report the optimal reception beam corresponding to the at least one transmission beam; or determining that the reporting indication information indicates that the optimal reception beam corresponding to the at least one transmission beam is to be reported in response to determining that a first parameter in a second information element in second RRC signaling received is configured as ON and a second parameter in the first information element associated with the second information element is not configured as none;

wherein the first information element is an information element configured to configure channel state information (CSI) reporting, and the second information element is an information element configured to configure a non-zero power CSI reference signal resource set.

5. The information reporting method according to claim 2, further comprising:

determining a target number indicated by the reporting indication information based on a third parameter in third radio resource control (RRC) signaling received; wherein the third parameter is a parameter configured to indicate the target number; and alternatively, the third parameter is a designated parameter reused by the target number.

6. The information reporting method according to claim 2, wherein reporting the optimal reception beam corresponding to the at least one transmission beam to the base station comprises at least one of:

reporting, in response to determining that a target number indicated by the reporting indication information is one and each time after the optimal reception beam corresponding to one transmission beam is determined, the optimal reception beam corresponding to the transmission beam to the base station; or reporting, in response to determining that a target number indicated by the reporting indication information is a plural number and after optimal reception beams corresponding to the target number of transmission beams respectively are determined, the optimal reception beams corresponding to the target number of transmission beams respectively to the base station.

7. The information reporting method according to claim 2, wherein reporting the optimal reception beam corresponding to the at least one transmission beam to the base station comprises:

reporting the optimal reception beam corresponding to the at least one transmission beam to the base station through at least one of a physical uplink control channel (PUCCH) resource and a physical uplink shared channel (PUSCH) resource.

8. The information reporting method according to claim 1, further comprising:

receiving, by the terminal, resource indication information configured to indicate the target resource from the base station; and wherein reporting the optimal reception beam corresponding to the at least one transmission beam to the base station comprises:

reporting the optimal reception beam corresponding to the at least one transmission beam to the base station through the target resource based on the resource indication information.

9. The information reporting method according to claim 8, wherein reporting the optimal reception beam corresponding to the at least one transmission beam to the base station through the target resource based on the resource indication information comprises:

reporting the optimal reception beam corresponding to the at least one transmission beam to the base station through a first physical uplink shared channel (PUSCH) Media Access Control Control Element (MAC CE) on the target resource based on the resource indication information.

10. The information reporting method according to claim 8, wherein reporting the optimal reception beam corresponding to the at least one transmission beam to the base station through the target resource based on the resource indication information comprises:

reporting the optimal reception beam corresponding to the at least one transmission beam to the base station through a second physical uplink shared channel (PUSCH) Media Access Control Control Element (MAC CE) on the target resource based on the resource indication information, wherein the second PUSCH MAC CE at least carries a second identifier, and the second identifier is configured to indicate that an information content reported through the second PUSCH MAC CE is the optimal reception beam corresponding to the at least one transmission beam.

11. The information reporting method according to claim 1, further comprising:

receiving reuse indication information sent by the base station, wherein the reuse indication information is configured to indicate that the second resource reuses the designated resource pre-allocated to the terminal.

12. The information reporting method according to claim 1, wherein reporting the optimal reception beam corresponding to the at least one transmission beam to the base station comprises:

reporting identification information of the at least one transmission beam and an index value of the optimal reception beam corresponding to the at least one transmission beam to the base station.

13. The information reporting method according to claim 12, wherein the identification information of the transmission beam comprises at least one of:

a channel state information (CSI) reference signal resource indicator corresponding to the transmission beam; or a synchronization signal block resource indicator corresponding to the transmission beam.

14. A beam switching method comprising:

receiving, by a base station, an optimal reception beam corresponding to at least one transmission beam and reported by a terminal;

determining, by the base station, in response to determining a switch from a first transmission beam to a second transmission beam within a same channel occupancy time, a first optimal reception beam corresponding to the first transmission beam and a second optimal reception beam corresponding to the second transmission beam based on the optimal reception beam corresponding to the at least one transmission beam and reported by the terminal; and switching, by the base station, from the first transmission beam to the second transmission beam in response to determining that the first optimal reception beam and the second optimal reception beam are a same beam;

wherein the method further comprises:

receiving, by the base station, a first scheduling request sent by the terminal on a first resource or a second resource; wherein the first scheduling request is configured to request the base station to configure a target resource configured to report the optimal reception beam corresponding to the at least one transmission beam for the terminal, the first resource is configured for the terminal to send the first scheduling request only, the second resource reuses a designated resource pre-allocated to the terminal, the designated resource is a resource for the terminal to send a second scheduling request, and the second scheduling request is a beam failure recovery (BFR) scheduling request for a secondary cell (Scell).

15. The beam switching method according to claim 14, further comprising:

switching, by the base station, from the first transmission beam to the second transmission beam in response to determining that the first optimal reception beam and the second optimal reception beam are different beams and a listen before talk (LBT) result indicates that a channel is not occupied.

16. The beam switching method according to claim 14, further comprising:

sending, by the base station, reporting indication information to the terminal, wherein the reporting indication information is configured to indicate at least one of:

whether to report first indication information of the optimal reception beam corresponding to the at least one transmission beam; or a target number of the transmission beam reported each time.

17. The beam switching method according to claim 16, wherein sending the reporting indication information to the terminal comprises:

sending first radio resource control (RRC) signaling comprising a first information element to the terminal, wherein the first information element comprises a first identifier, the first information element is an information element configured to configure channel state information (CSI) reporting, and the first identifier is configured to indicate whether to report the optimal reception beam corresponding to the at least one transmission beam.

18. The beam switching method according to claim 17, wherein the first identifier is configured to instruct the terminal to report the optimal reception beam corresponding to the at least one transmission beam when being a first preset value; and the first identifier is configured to instruct the terminal not to report the optimal reception beam corresponding to the at least one transmission beam when being a second preset value.

19. A base station, comprising:

one or more processors; and a memory configured to store a processor-executable instruction;

wherein the processor-executable instruction, when executed by the one or more processors, causes the base station to perform the beam switching method according to claim 14.

20. A terminal, comprising:

one or more processors; and a memory configured to store a processor-executable instruction;

wherein the processor-executable instruction, when executed by the one or more processors, causes the terminal to:

determine an optimal reception beam corresponding to at least one transmission beam; and report the optimal reception beam corresponding to the at least one transmission beam to a base station, so that in a case where the base station switches from a first transmission beam to a second transmission beam within a same channel occupancy time, and in a case where a first optimal reception beam corresponding to the first transmission beam and a second optimal reception beam corresponding to the second transmission beam are a same beam, the base station switches from the first transmission beam to the second transmission beam;

wherein the processor-executable instruction, when executed by the one or more processors, further causes the terminal to:

send, by the terminal, a first scheduling request to the base station on a first resource or a second resource; wherein the first scheduling request is configured to request the base station to configure a target resource configured to report the optimal reception beam corresponding to the at least one transmission beam for the terminal, the first resource is configured for the terminal to send the first scheduling request only, the second resource reuses a designated resource pre-allocated to the terminal, the designated resource is a resource for the terminal to send a second scheduling request, and the second scheduling request is a beam failure recovery (BFR) scheduling request for a secondary cell (Scell).

* * * * *